(12) United States Patent
Georgeson et al.

(10) Patent No.: US 12,736,963 B2
(45) Date of Patent: Sep. 15, 2026

(54) REPAIR OF STRUCTURES USING UNMANNED AERIAL VEHICLES

(71) Applicant: The Boeing Company, Arlington, VA (US)

(72) Inventors: Gary E. Georgeson, Tacoma, WA (US); Joseph L. Hafenrichter, Seattle, WA (US); James J. Troy, Issaquah, WA (US); Gregory J. Sweers, Renton, WA (US)

(73) Assignee: The Boeing Company, Arlington, VA (US)

( * ) Notice: Subject to any disclaimer, the term of this patent is extended or adjusted under 35 U.S.C. 154(b) by 354 days.

(21) Appl. No.: 18/119,633

(22) Filed: Mar. 9, 2023

(65) Prior Publication Data

US 2023/0229165 A1 Jul. 20, 2023

Related U.S. Application Data

(62) Division of application No. 16/776,177, filed on Jan. 29, 2020, now Pat. No. 11,630,459.

(51) Int. Cl.
*G05D 1/00* (2024.01)
*B25J 11/00* (2006.01)
(Continued)

(52) U.S. Cl.
CPC .......... *G05D 1/0094* (2013.01); *B25J 11/005* (2013.01); *B25J 15/0616* (2013.01);
(Continued)

(58) Field of Classification Search
None
See application file for complete search history.

(56) References Cited

U.S. PATENT DOCUMENTS 6,968,753 B2 * 11/2005 Tzeng ............... H01L 21/67766 414/331.14
9,185,391 B1 * 11/2015 Prechtl .................... G06T 7/593
(Continued)

FOREIGN PATENT DOCUMENTS

CN 207496930 6/2018
DE 202014011083 U1 * 9/2017 ............ B64U 20/87
(Continued)

OTHER PUBLICATIONS

European Office Action dated Apr. 20, 2023 in European Patent Application No. 20205147.0 (European counterpart to the parent of the instant divisional patent application).
(Continued)

*Primary Examiner* — Mahmoud S Ismail
*Assistant Examiner* — Jacob Daniel Underbakke
(74) *Attorney, Agent, or Firm* — Joseph M. Butscher; Carroll, Hoette & Butscher, LLC

(57) ABSTRACT

Methods and apparatus for performing repair operations using an unmanned aerial vehicle (UAV). The methods are enabled by equipping the UAV with tools for rapidly repairing a large structure or object (e.g., an aircraft or a wind turbine blade) that is not easily accessible to maintenance personnel. A plurality of tools are available for robotic selection and placement at the repair site. The tools are designed to perform respective repair operations in sequence in accordance with a specified repair plan, which plan may take into account the results of a previously performed UAV-enabled inspection.

20 Claims, 21 Drawing Sheets

(51) Int. Cl.

| | |
|---|---|
| ***B25J 15/06*** | (2006.01) |
| ***B64U 10/10*** | (2023.01) |
| ***B64U 10/13*** | (2023.01) |
| ***B64U 30/20*** | (2023.01) |
| ***B64U 50/19*** | (2023.01) |
| ***B64U 70/92*** | (2023.01) |
| ***B64U 101/00*** | (2023.01) |
| ***G08G 5/30*** | (2025.01) |

(52) U.S. Cl.

CPC ............ *B64U 10/10* (2023.01); *B64U 10/13* (2023.01); *B64U 30/20* (2023.01); *B64U 50/19* (2023.01); *G08G 5/30* (2025.01); *B64U 70/92* (2023.01); *B64U 2101/00* (2023.01)

(56) References Cited

U.S. PATENT DOCUMENTS

| | | | | |
|---|---|---|---|---|
| 11,199,853 | B1 * | 12/2021 | Afrouzi | B25J 13/006 |
| 2009/0050750 | A1 * | 2/2009 | Goossen | B64U 50/14<br>901/14 |
| 2015/0314434 | A1 * | 11/2015 | Bevins, Jr. | B23D 59/001<br>408/124 |
| 2017/0075351 | A1 * | 3/2017 | Liu | H04N 23/685 |
| 2018/0035606 | A1 * | 2/2018 | Burdoucci | A01D 34/008 |
| 2018/0072415 | A1 * | 3/2018 | Cantrell | B64D 1/10 |
| 2018/0354625 | A1 * | 12/2018 | Verkade | B64D 9/00 |
| 2019/0061143 | A1 * | 2/2019 | Chandra | B25J 17/00 |
| 2019/0248007 | A1 * | 8/2019 | Duffy | B25J 9/1653 |
| 2019/0276140 | A1 * | 9/2019 | Poltorak | B64U 50/19 |
| 2019/0291865 | A1 * | 9/2019 | O'Donnell | B65D 81/3818 |
| 2019/0321971 | A1 * | 10/2019 | Bosworth | B25J 15/0028 |
| 2019/0338759 | A1 * | 11/2019 | Badger | B29C 73/02 |
| 2019/0369057 | A1 * | 12/2019 | Mattar | G01N 29/265 |
| 2020/0047353 | A1 | 2/2020 | Zheng | |
| 2020/0086984 | A1 * | 3/2020 | LeGrand | B64C 27/26 |
| 2020/0231392 | A1 * | 7/2020 | Singh | B65G 61/00 |
| 2020/0301445 | A1 * | 9/2020 | Jourdan | G06K 19/06037 |
| 2021/0155344 | A1 | 5/2021 | Yanez | |
| 2021/0232989 | A1 * | 7/2021 | Rana | G05B 19/418 |

FOREIGN PATENT DOCUMENTS

| | | | | |
|---|---|---|---|---|
| EP | 3109622 A1 | | 12/2016 | |
| FR | 3069524 A1 | | 2/2019 | |
| JP | 2019147556 A | | 9/2019 | |
| KR | 10167916 | | 11/2016 | |
| KR | 20180009803 A | | 1/2018 | |
| WO | 2017183636 A1 | | 10/2017 | |
| WO | WO 2018/072654 | | 4/2018 | |
| WO | WO-2019075179 A1 | * | 4/2019 | G06Q 50/02 |
| WO | WO 2019/200497 | | 10/2019 | |

OTHER PUBLICATIONS

European Office Action dated Oct. 18, 2023 in European Patent Application No. 20205147.0 (European counterpart to the parent of the instant divisional patent application).

Chinese Office Action dated Apr. 12, 2024 in Chinese Patent Application No. 202011580026.X (Chinese counterpart to the parent of the instant divisional patent application).

Machine translation of CN 207496930.

Machine translation of KR 101679716.

* cited by examiner 10
12
2
18
20
16
8
14
4

6
18
20
16
4
10
12

98
94
58
Sand
96
68

68
58
Sander
94
98
99

74
94
Cleaner
72
Dryer
94
70
Additive
Repair Tool
94

REPAIR OF STRUCTURES USING UNMANNED AERIAL VEHICLES

RELATED PATENT APPLICATION

This application is a divisional of and claims domestic benefit from U.S. patent application Ser. No. 16/776,177 filed on Jan. 29, 2020, now U.S. Pat. No. 11,630,459.

BACKGROUND

This disclosure generally relates to inspection and repair of structures. In particular, this disclosure relates to the use of unmanned aerial vehicles (UAVs) for in-service repair of inaccessible or limited-access structures.

In-service human-based repair of large structures and various types of large objects can be time consuming, expensive and difficult for an individual to perform. Examples of large structures that pose significant repair challenges include wind turbine blades, aircraft fuselages and wings, rockets and satellites, storage tanks, bridges, dams, levees, power plants, power lines or electrical power grids, water treatment facilities; oil refineries, chemical processing plants, high-rise buildings, and infrastructure associated with electric trains and monorail support structures.

More specifically, materials and structures employed in the aerospace industry and elsewhere may periodically require repair for in-service damage. Rapid inspection and repair of aircraft are important for military and commercial applications in order to decrease down time. For example, the use of composite structures is increasingly common on commercial aircraft. Composites may be damaged in the course of service. Examples of such in-service damage include lightning strike, impact damage due to hail, runway debris (object damage), or collisions with ground support vehicles.

In instances in which the inspection of a structure determines that the structure should undergo repair, such as to address a structural anomaly identified during the inspection, the repair should be performed in a timely manner so that the structure may be returned to service promptly. For example, damage may be discovered at the airport loading gate just prior to a departure. A repair may be provided that would be temporary or permanent depending on the extent of the damage. These may be non-structural (such as sealing the surface so moisture does not get in) or structural (restoring some level of strength to the area). The current approach for repair of impacts, delaminations, scratches, cracks, burns, or tears on most in-service aircraft (composite or metal) is to use manual labor, with lifts or stands, safety harnesses, etc. For minor or temporary repairs, this causes unnecessary operational delays, exposure to potential safety conditions and costs to return the aircraft to flight. The cost of access, labor, and related time to conduct the repair and loss of revenue during the interruption may be excessive. If repair equipment is not available or if the repair may be extensive, the flight might be cancelled. The aircraft may be grounded and taken out of service to be ferried or towed to a maintenance base, with consequent significant economic impact to the aircraft operator.

There is a need for automated apparatus for rapid repair and return to service of large composite structures (e.g., aircraft and wind turbine blades) after a planned structural maintenance check or after an event that may have created damage (e.g., lightning strike, physical impact, bird strike).

SUMMARY

The subject matter disclosed in some detail below is directed to methods and apparatus for performing repair operations using an unmanned aerial vehicle (UAV). The methods are enabled by equipping a UAV with tools for rapidly repairing a large structure or object (e.g., an aircraft or a wind turbine blade) that is not easily accessible to maintenance personnel. A plurality of tools are available for robotic selection and placement at the repair site. The tools are designed to perform respective repair operations in sequence in accordance with a specified repair plan, which plan may take into account the results of a previously performed UAV-enabled inspection.

In accordance with some embodiments, the apparatus includes a UAV equipped with a multi-tool module having a plurality of tools for performing different functions mounted to the distal ends of respective angularly distributed support arms which extend outward from a rotatable hub. The various tools may be applied to the repair site in sequence. When the repair procedure calls for a particular tool to be used, the hub is rotated to bring the appointed tool to an angular position overlying the repair site. In accordance with one embodiment, the tool is rotated to a position overlying and in contact with or proximity to the repair site. In accordance with another embodiment, the tool is first rotated to a position overlying the repair site and then lowered into contact with or proximity to the repair site.

In accordance with other embodiments, the apparatus includes a UAV equipped with a rotatable tool pick-and-place robotic arm and a plurality of tools stored at respective tool stations within reach of the rotatable tool pick-and-place robot. A controller is configured to cause the tool pick-and-place robot to rotate to a first angular position and pick up a tool, and then to rotate to a second angular position while carrying the tool and place the tool in contact with or in proximity to the repair site for performing a repair operation. In accordance with an alternative embodiment, the tools are stored at respective tool stations on the ground and the UAV is equipped with a gripper or clamp (e.g., a collet) that enables the UAV to pick up a tool and then fly to the repair site while carrying the tool.

Although various embodiments of methods and apparatus for repairing a structure or object using a tool-equipped UAV are described in some detail later herein, one or more of those embodiments may be characterized by one or more of the following aspects.

One aspect of the subject matter disclosed in detail below is an apparatus comprising an unmanned aerial vehicle and a multi-tool module coupled to the unmanned aerial vehicle, wherein: (a) the unmanned aerial vehicle comprises a body frame, a plurality of rotor motors mounted to the body frame, and a plurality of rotors operatively coupled to respective rotor motors of the plurality of rotor motors, and (b) the multi-tool module comprises a hub which is rotatable about an axis of rotation, a plurality of arms having respective first ends fixedly coupled to the hub, a plurality of tools mounted to respective second ends of respective arms of the plurality of arms, and a motor operatively coupled to drive rotation of the hub.

In accordance with some embodiments of the apparatus described in the immediately preceding paragraph, the multi-tool module further comprises a base; and the hub comprises an inner cylinder which is rotatable relative to the base and a capped head which caps a topmost portion of the inner cylinder. In one embodiment, the capped head is translatable relative to the topmost portion of the inner cylinder; and the plurality of arms are fixedly coupled to the capped head. In other embodiments, the plurality of arms are rotatably coupled to the capped head. The arms may be driven to rotate by a linked ring that translates along the inner cylinder or by respective linear actuators.

Another aspect of the subject matter disclosed in detail below is an apparatus comprising an unmanned aerial vehicle and a tool pick-and-place module coupled to the unmanned aerial vehicle, wherein: (a) the unmanned aerial vehicle comprises a body frame, a plurality of rotor motors mounted to the body frame, and a plurality of rotors operatively coupled to respective rotor motors of the plurality of rotor motors; (b) the tool pick-and-place module comprises a platform comprising a plurality of tool stations, a tool pick-and-place robot mounted to the platform, and a plurality of tools positioned at respective tool stations; and (c) the tool pick-and-place robot comprises a base, a hub which is rotatable about the base, an arm having a first end fixedly coupled to the hub and a second end at a distance from the hub, and a tool holder mounted to the second end of the arm.

A further aspect of the subject matter disclosed in detail below is an apparatus comprising an unmanned aerial vehicle and a collet module coupled to the unmanned aerial vehicle, wherein: the unmanned aerial vehicle comprises a body frame, a plurality of rotor motors mounted to the body frame, and a plurality of rotors operatively coupled to respective rotor motors of the plurality of rotor motors; and the collet module comprises a collet which is configured to transition between clamped and unclamped states. During execution of a repair operation, the apparatus further comprises a tool comprising an attachment post clamped by the collet in a clamped state. The tool is selected from a group of tools that includes a subtractive repair tool, an additive repair tool, a cleaning tool, and a drying tool.

Yet another aspect of the subject matter disclosed in detail below is a method for repairing a structure using an unmanned aerial vehicle comprising a collet, the method comprising: (a) storing first and second tools at a ground station, wherein each of the first and second tools comprises a respective attachment post; (b) flying the unmanned aerial vehicle to a first position where the collet is aligned with the attachment post of the first tool; (c) closing the collet to clamp on the attachment post of the first tool; (d) flying the unmanned aerial vehicle toward a structure to be repaired with the first tool depending from the unmanned aerial vehicle; (e) landing the unmanned aerial vehicle on a surface of the structure; (f) using the first tool to perform a first repair operation on an area on the surface of the structure while the unmanned aerial vehicle is parked on the surface of the structure; (g) flying the unmanned aerial vehicle to the first position; (h) opening the collet to release the attachment post of the first tool; (i) flying the unmanned aerial vehicle to a second position where the collet is aligned with the attachment post of the second tool; (j) closing the collet to clamp on the attachment post of the second tool; (k) flying the unmanned aerial vehicle toward the structure with the second tool depending from the unmanned aerial vehicle; (l) landing the unmanned aerial vehicle on the surface of the structure; and (m) using the second tool to perform a second repair operation on the area on the surface of the structure while the unmanned aerial vehicle is parked on the surface of the structure.

Other aspects of methods and apparatus for repairing a structure or object using a tool-equipped UAV are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1A:
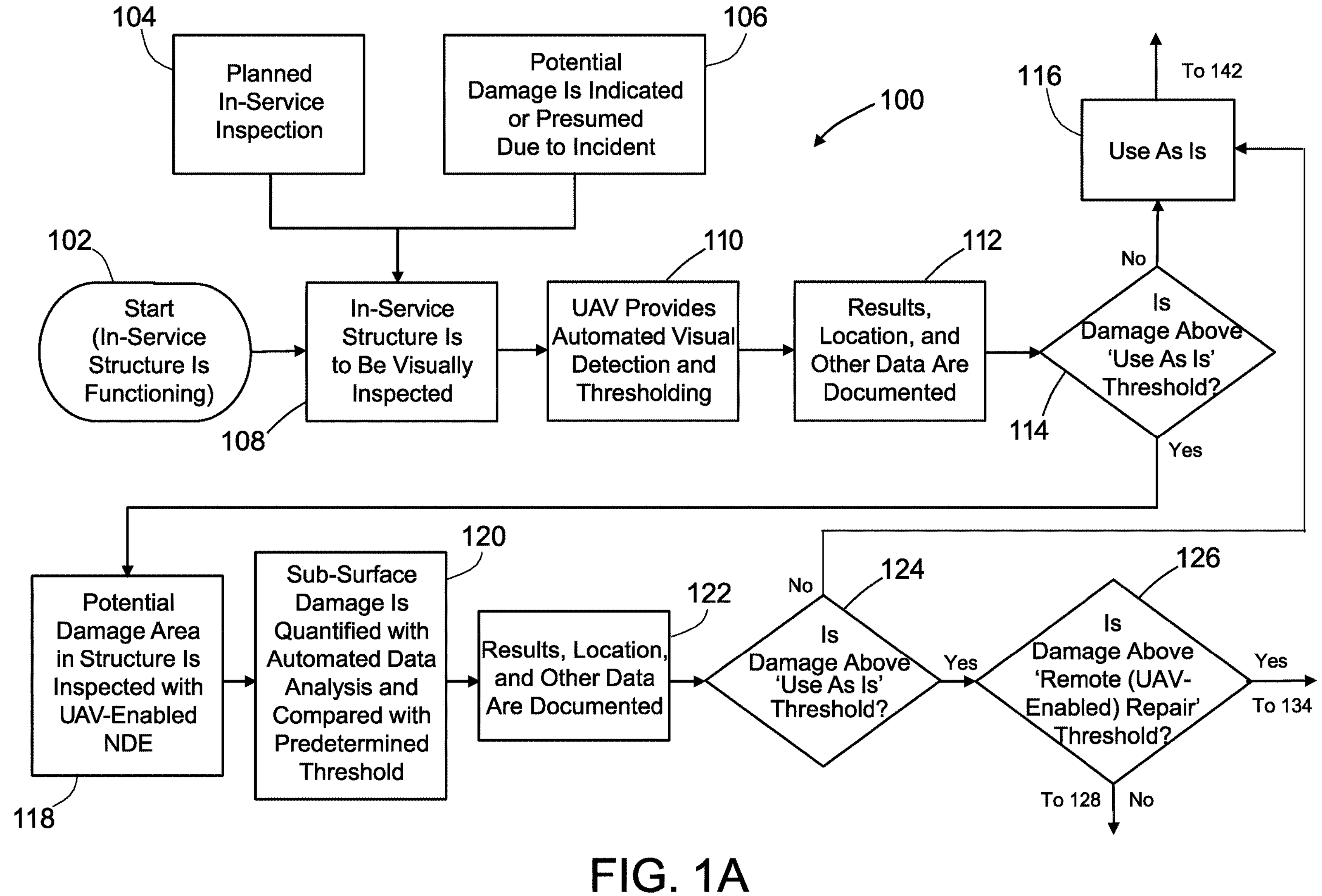
FIGS. 1A and 1B form a flowchart identifying steps of a method for inspecting and repairing a damaged portion of a large structure or object using one or more UAVs in accordance with some embodiments.

For the purpose of illustration, methods and apparatus for inspecting and repairing a structure or object using a tool-equipped UAV will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The term "structure" as used herein is not limited to aircraft and wind turbines. This disclosure relates to systems and methods that can be used to inspect and repair any number of parts or structures of different shapes and sizes, such as machined forgings, castings, pipes, or composite panels or parts. In addition, an inspected and repaired structure can include various components, such as a substructure for providing additional support to the structure. Further, an inspected and repaired structure may be made of any one of a number of materials. For example, an inspected and repaired structure can include a metallic material, such as aluminum, or a composite material, such as graphite-epoxy. In particular, an inspected and repaired structure can be an aircraft component made of composite material.

In accordance with the embodiments disclosed in some detail below, the UAV takes the form of a rotorcraft having multiple rotors. In accordance with the implementation disclosed herein, each rotor has two mutually diametrally opposed rotor blades. However, in alternative implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rotor rotation rate to generate sufficient aerodynamic lift force to support the weight of the UAV and sufficient thrust to counteract aerodynamic drag in forward flight. The UAVs disclosed herein include a controller which preferably takes the form of a plurality of rotor motor controllers that communicate with an on-board computer configured to coordinate the respective rotations of the rotors. The controller is configured (e.g., programmed) to control the rotors to cause the UAV to fly along a flight path to a location where the UAV is in proximity or contact with an area on the surface of a structure to be inspected and repaired. (As used herein, the term "location" comprises position in a three-dimensional coordinate system and orientation relative to that coordinate system.)

In accordance with various embodiments of the process proposed herein, a UAV is configured to perform a repair operation in a manner that enables a large structure, such as an aircraft or a wind turbine, to be returned to service quickly after an impact incident or discovery of potential damage. In accordance with some embodiments, the UAV is equipped with means for collecting information (e.g. image, scans, and three-dimensional (3-D) location data) which may indicate the presence of anomalies.

Figure 1B:
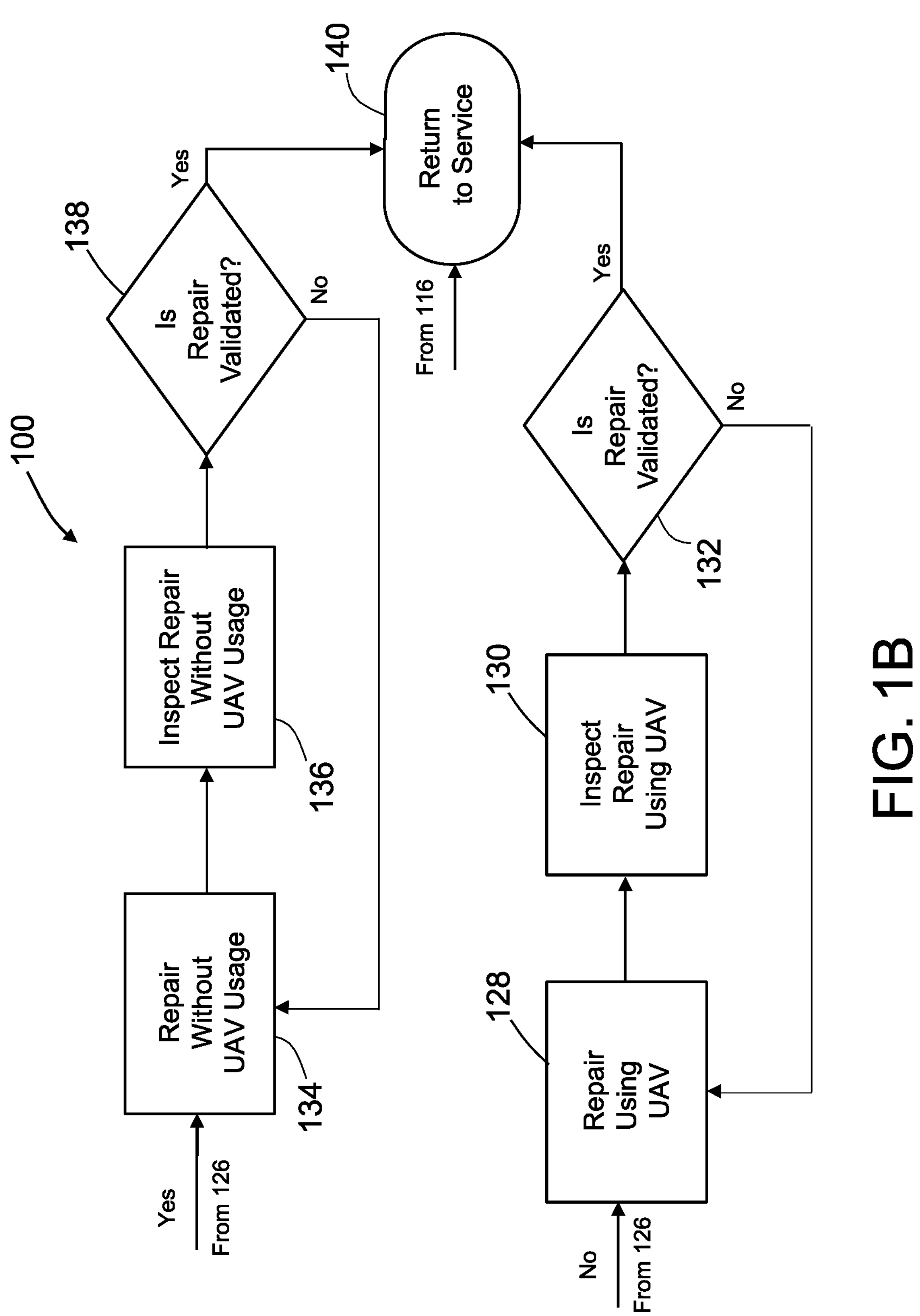

FIGS. 1A and 1B form a flowchart identifying steps of a method 100 for inspecting and repairing a damaged portion of a large structure or object that is in service using one or more UAVs. As will be explained in more detail below, a computer on-board the UAV may be configured to determine whether acquired data indicates damage greater (above) or less (below) than a particular threshold value. As used herein, a "use as is" threshold means a threshold which has been specified to demarcate between structure that does not require a repair (e.g., if the indicated damage is less than or below the "use as is" threshold) and structure that potentially requires repair (e.g., if the indicated damage is greater than or above the "use as is" threshold). As used herein, a "remote repair" threshold means a threshold which has been specified to demarcate between structure that requires a repair that could be performed by a UAV (e.g., if the indicated damage is less than or below the "remote repair" threshold) and structure that requires a repair not performed by a UAV (e.g., if the indicated damage is greater than or above the "remote repair" threshold).

Referring to FIG. 1A, at the start 102 of the method 100, the in-service structure is functioning, but either the scheduled time for a planned in-service inspection has arrived (step 104) or potential damage to the in-service structure is indicated or presumed due to an incident (step 106). For example, an object impact event has been detected or suspected.

The overall inspection and repair process is initiated when a maintenance operations center dispatches a UAV equipped with a camera to perform a visual inspection of the in-service structure (step 108). The dispatched UAV flies to the vicinity of the possible impact area (hereinafter "area of interest"), uses the camera to acquire images of the area of interest, and then compares the acquired image data to a first "use as is" threshold (step 110). The results of the visual inspection and thresholding, the location of the imaged area and other data are then recorded in a non-transitory tangible computer-readable storage medium on-board the camera-equipped UAV (step 112). A computer on-board the camera-equipped UAV then makes a determination whether the damage indicated by the image data is above the first "use as is" threshold or not (step 114). In the alternative, if the camera-equipped UAV is not also equipped with an NDI sensor unit, then the camera-equipped UAV wirelessly transmits data representing the results of the visual inspection and thresholding, data representing the location of the imaged area and other data to the maintenance operations center for evaluation.

On the one hand, if a determination is made in step 114 that the damage indicated by the image data is not above the first "use as is" threshold, then the structure is used as is (step 116) and returned to service (step 140 in FIG. 1B). On the other hand, if a determination is made in step 114 that the damage indicated by the image data is above the first "use as is" threshold, then a UAV equipped with an NDI sensor unit (which may be the same UAV as the camera-equipped UAV or a separate UAV) is flown to a location where the NDI sensor unit is within an measurement range of the potentially damaged area (hereinafter "potential damaged area") on the surface of the structure. For example, the NDI sensor-equipped UAV may land on the surface of the structure and then use the NDI sensor unit to acquire NDI sensor data in the potential damaged area (step 118). The computer on-board the NDI sensor-equipped UAV then performs an analysis of the NDI sensor data that quantifies the sub-surface damage and compares the resulting quantitative data to various predetermined thresholds (step 120). The results of the analysis and thresholding, the location of the sensed area and other data are then recorded in a non-transitory tangible computer-readable storage medium on-board the NDI sensor-equipped UAV (step 122). A computer on-board the NDI sensor-equipped UAV then makes a determination whether the damage indicated by the NDI sensor data is above a second "use as is" threshold or not (step 124). In the alternative, if the NDI sensor-equipped UAV is not also equipped with a repair tool, then the NDI sensor-equipped UAV wirelessly transmits data representing the results of the analysis and thresholding, data representing the location of the sensed area and other data to the maintenance operations center for evaluation.

On the one hand, if a determination is made in step 124 that the damage indicated by the NDI sensor data is not above the second "use as is" threshold, then the structure is used as is (step 116) and returned to service (step 142 in FIG. 1B). On the other hand, if a determination is made in step 124 that the damage indicated by the NDI sensor data is above the second "use as is" threshold, then the computer on-board the NDI sensor-equipped UAV makes a determination whether the damage indicated by the NDI sensor data is below a "remote repair" threshold or not (step 126). In the alternative, if the NDI sensor-equipped UAV is not also equipped with a repair tool, then the maintenance operations center has a computer programmed to make the determination in step 126.

Depending on the outcome of step 122 (shown in FIG. 1A), the process may proceed in accordance with either a remote or UAV-enabled repair procedure or a manual repair procedure that requires human intervention, the steps of both of which are identified in FIG. 1B. On the one hand, if a determination is made in step 122 that the damage indicated by the NDI sensor data is not above the "remote repair" threshold, then a UAV equipped with a repair tool (which may be the same UAV as the camera-equipped UAV or a separate UAV) is flown to a location where the repair tool is placed in contact with the structure in the area to be repaired. While the repair tool-equipped UAV is stationary, the damaged area is repaired using the repair tool (step 128 in FIG. 1B). On the other hand, if a determination is made in step 122 that the damage indicated by the NDI sensor data is above the "remote repair" threshold, then the NDI sensor-equipped UAV wirelessly transmits a message notifying the maintenance operations center that the structure requires direct human access for a more in-depth or complicated repair of the damaged structure (step 134 in FIG. 1B). In the latter case, a UAV-enabled repair is not made.

Still referring to FIG. 1B, following completion of the UAV-enabled repair in step 128, a UAV equipped with either a camera or an NDI sensor unit (which may be the same UAV as the camera-equipped or NDI sensor-equipped UAV described above or a separate UAV) is used to perform an inspection to verify that the repaired structure is good for service (step 130). The results of the inspection are stored in a non-transitory tangible computer-readable storage medium on-board the inspecting UAV and the UAV wirelessly transmits a message to the maintenance operations center reporting completion of the repair. A determination is then made whether the repair is validated or not (step 132). On the one hand, if the repair is not validated, then the repair procedure returns to step 128. On the other hand, if the repair is validated, then the repaired structure is returned to service (step 140).

Conversely, following issuance of the notification indicating that a repair by means not including a UAV (e.g., a manual repair) is recommended, the maintenance operations center dispatches appropriately equipped technicians to conduct a repair of the damaged area on the structure (step 134). Following completion of the repair by means not including a UAV in step 134, a NDI or visual inspection of the repaired portion of the structure is performed, also by means not including a UAV (step 136). A determination is then made whether the repair is validated or not (step 138). On the one hand, if the repair is not validated, then the repair procedure returns to step 134. On the other hand, if the repair is validated, then the repaired structure is returned to service (step 140).

Various embodiments of apparatus for performing a repair of the damaged area on the surface of a structure (step 128) will now be described in some detail. The tools and tool support devices carried by a UAV will be referred to herein as the "payload". Such a repair payload may be fixedly or pivotably coupled to the body frame of the UAV or may be fixedly coupled to a payload support frame which is pivotably coupled to the UAV body frame. Some of the repair payloads disclosed herein are referred to herein as modules. As used herein, the term "module" refers to an independently operable unit that may be attached to a UAV and comprises an assembly of electronic and mechanical components configured to perform repair functions using that repair matter.

The UAVs disclosed herein include a controller which preferably takes the form of a plurality of rotor motor controllers that communicate with an onboard computer system configured to coordinate the respective rotations of the rotors. The controller is configured (e.g., programmed) to control the rotors in accordance with flight guidance received from a 3-D localization system that tracks the location of the UAV relative to the target environment. The target destination of the UAV is a location where a plurality of standoff contact elements of the UAV contact the surface of the structure to be repaired (hereinafter "repairable structure"). Once the standoff contact elements are in contact with the surface of the repairable structure, the controller activates surface attachment devices (e.g., vacuum adherence devices) to maintain the UAV stationary at the location with the standoff contact elements abutting the surface. Then the repair tools are sequentially positioned and activated to perform respective repair operations. Upon completion of the repair procedure, the UAV releases the surface attachment devices and lifts offs from the surface, again using reorientation and speed changes on a subset of the rotors.

Figure 2:
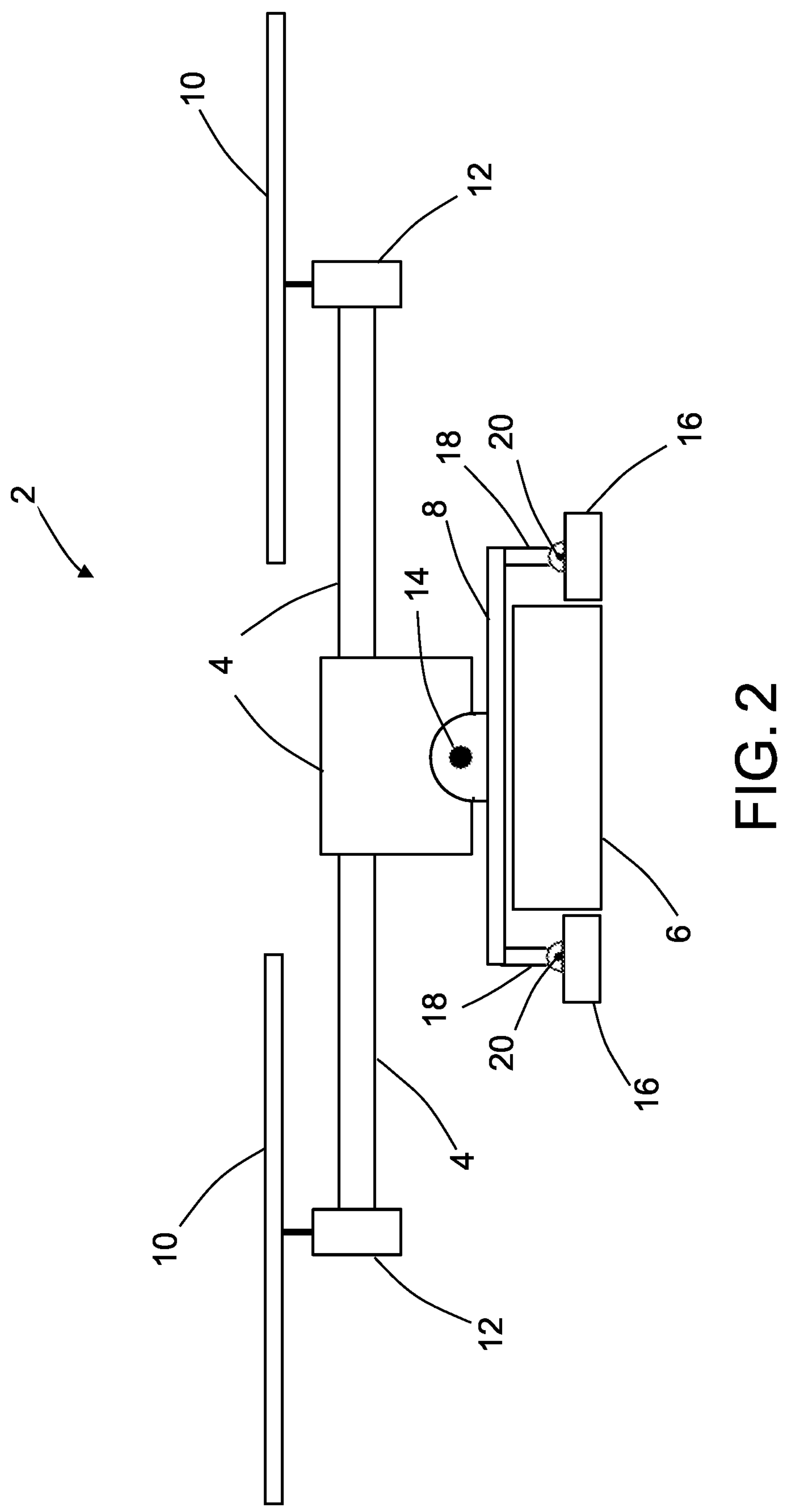
FIG. 2 is a diagram representing a side view of a payload-carrying UAV in accordance with one embodiment.

The UAV 2 depicted in FIG. 2 carries a payload 6 which includes one or more tools for performing a repair function on a surface of a remote limited-access structure. In accordance with some embodiments described in some detail below, the payload 6 is a multi-tool module comprising a plurality of tools. In accordance with another embodiment described in some detail below, the payload 6 is a collet module that includes a collet that holds a single tool.

As seen in FIG. 2, the UAV 2 includes a body frame 4, a plurality of rotor motors 12 mounted to the body frame 4, and a plurality of rotors 10 respectively operatively coupled to the plurality of rotor motors 12. In addition, the UAV 2 includes a payload support frame 8 pivotably coupled to the body frame 4 by means of a gimbal pivot 14. The payload support frame 8 includes a plurality of (at least three) standoff support members 18. A respective standoff contact foot 16 is coupled to the distal end of each standoff support member 18. In one proposed implementation, the standoff contact feet 16 are made of compliant (e.g., elastomeric) material. The standoff support members 18 and standoff contact feet 16 form a standoff system that maintains the payload 6 in a standoff position relative to the surface being repaired.

Figure 2A:
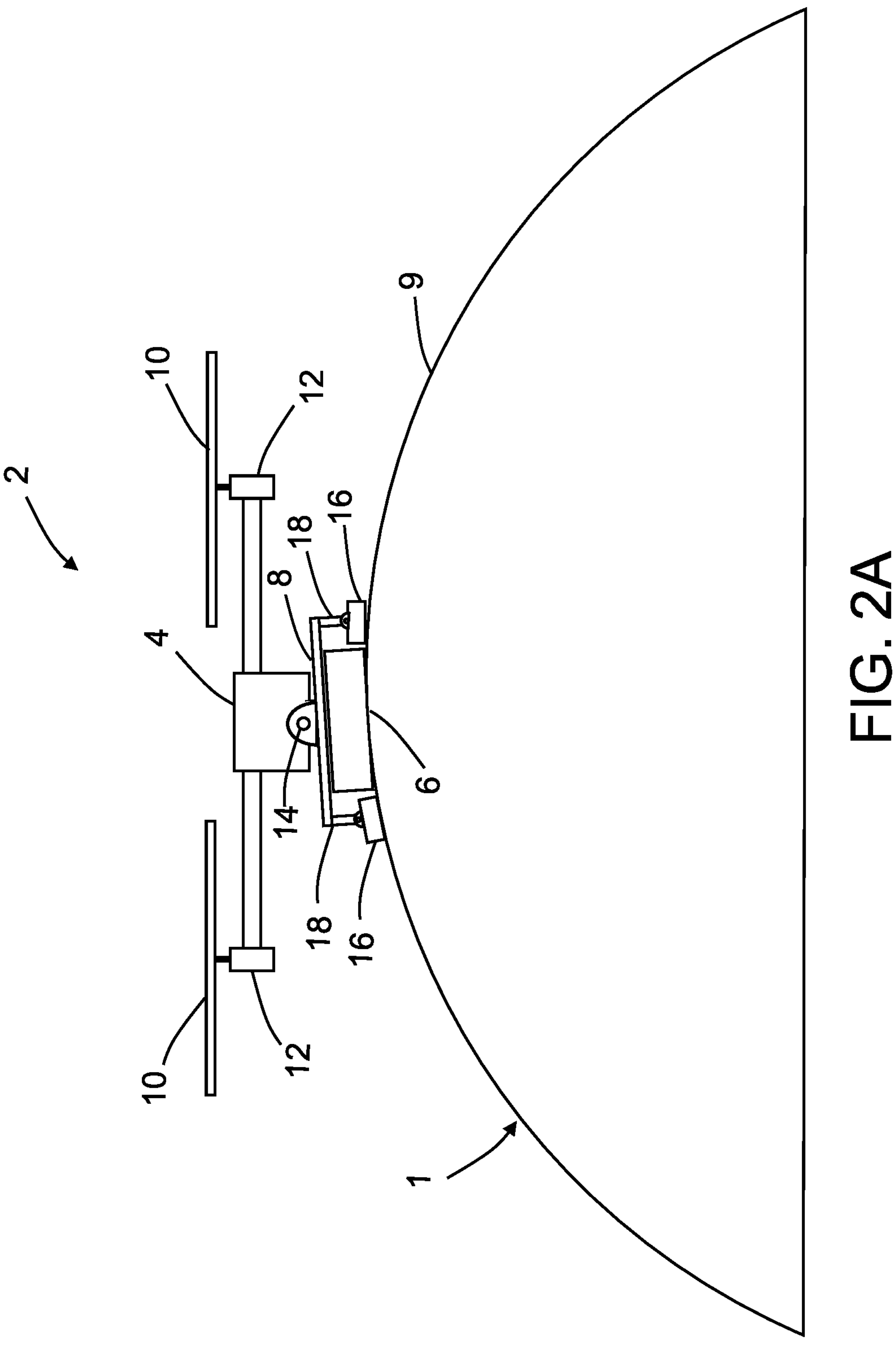
FIG. 2A is a diagram representing a side view of the payload-carrying UAV depicted in FIG. 2 after landing on a structure having a rounded surface, such as an aircraft fuselage or a storage tank.
Figure 2B:
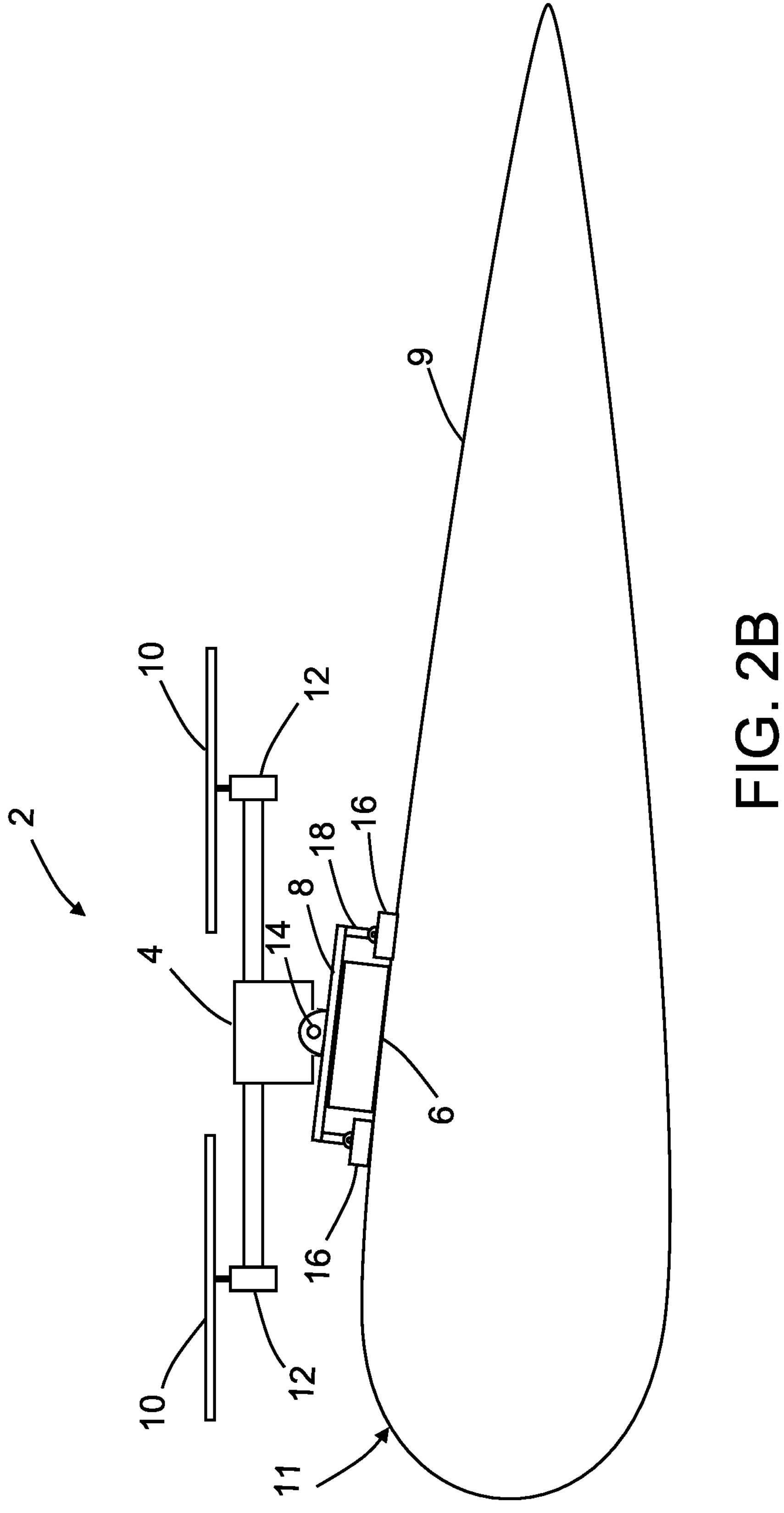
FIG. 2B is a diagram representing a side view of the payload-carrying UAV depicted in FIG. 2 after landing on an airfoil-shaped body, such as an aircraft wing or a wind turbine blade.

In accordance with the embodiment depicted in FIG. 2, the standoff contact feet 16 are pivotably coupled to the distal ends of the standoff support members 18 by means of respective pivots 20. The pivotable coupling enables the standoff contact feet 16 to adjust their orientations so that the feet lie flat on curved surfaces. FIG. 2A shows the payload-carrying UAV 2 after landing on a target object 1 having a surface 9, such as the surface an aircraft fuselage or the upper surface of a storage tank. FIG. 2B shows the same UAV 2 after landing on a surface 9 of an airfoil-shaped body 11 such as an aircraft wing or a wind turbine blade. In both scenarios, each standoff contact foot 16 is able to reorient to be parallel to a flat or tangent to a curved surface 9 in the area of abutment.

Figure 3A:
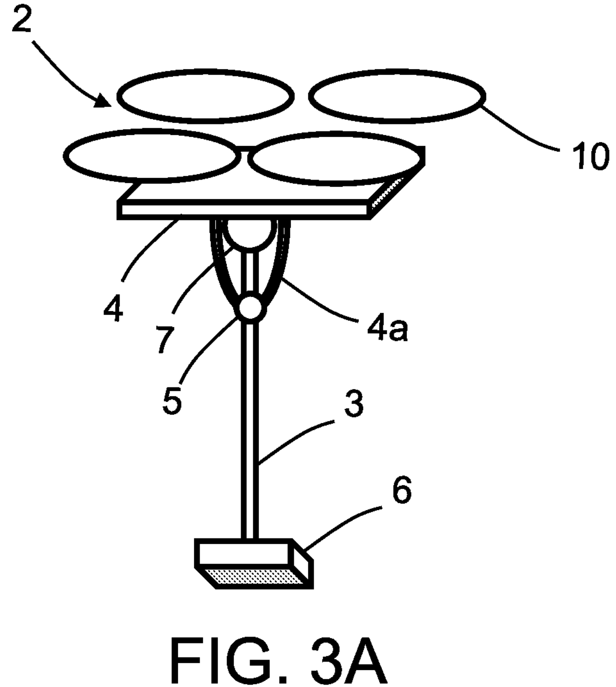
FIGS. 3A through 3D are diagrams representing respective three-dimensional views of a UAV having a pivotable arm for carrying a payload at successive stages during a process of transporting and placing the payload on a surface of a repairable structure.
Figure 3B:
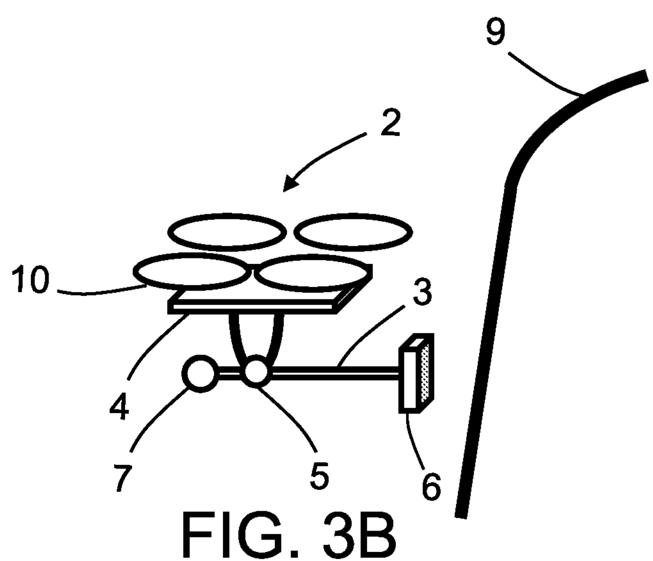
Figure 3C:
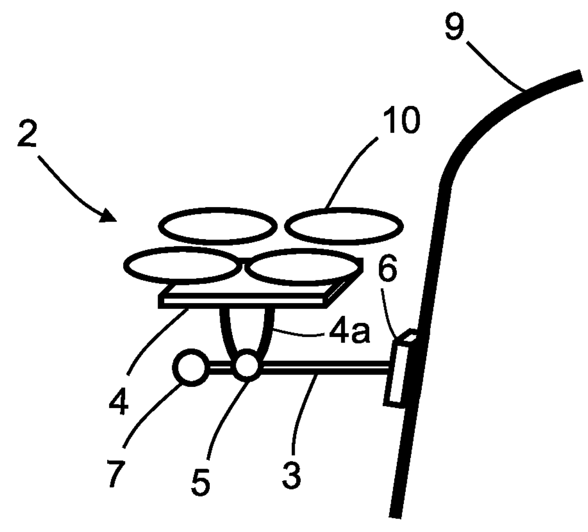
Figure 3D:
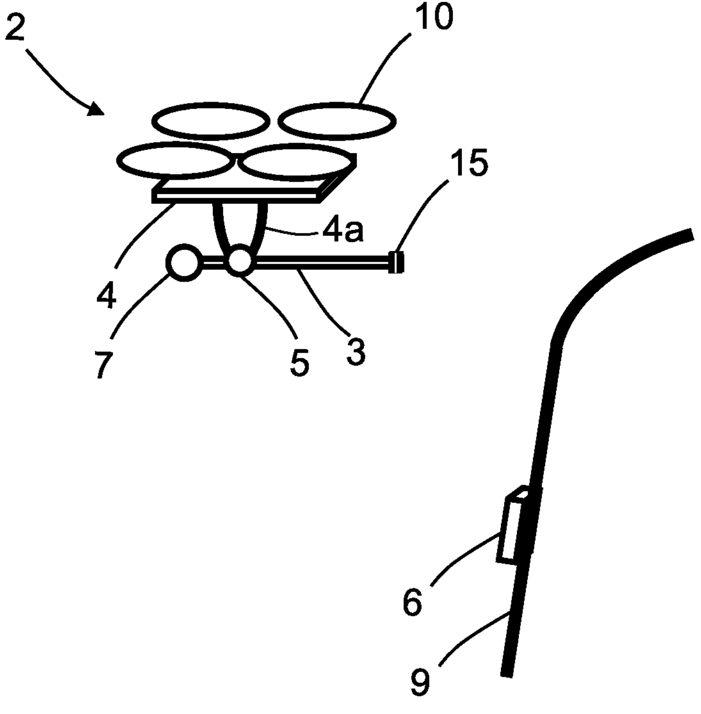

FIGS. 3A through 3D are diagrams representing respective three-dimensional views of a UAV 2 having a pivotable arm 3 (hereinafter "arm 3") for carrying a payload 6 at successive stages during a process of transporting and placing the payload 6 on a surface 9 of a repairable structure. The arm 3 is pivotably coupled to the body frame 4 of the UAV 2 by means of a pivot 5 which is supported by a pivot support frame 4*a*. The pivot support frame 4*a* is attached to or integrally formed with body frame 4. The payload 6 is coupled to one end of arm 3 by a coupling mechanism 15 (visible in FIG. 3D). A counterweight 7 is coupled to the other end of arm 3. The payload 6 and counterweight 7 have respective known weights. Controlling the arm 3 to align the payload 6 with a portion of the surface 9 involves controlling the arm 3 taking one or more parameters into account. Specifically, controlling the angular position of arm 3 may be based on the arm length, fulcrum point (at pivot 5), counterweight, and payload weight. Controlling the angular position of arm 3 based on these factors may prevent the UAV 2 from substantially pitching or rolling when aligning the payload 6 with a portion of the surface 9 to be contacted by the payload 6. The location (position and orientation) of the pivot 5 relative to the surface 9 may be adjusted until the payload 6 lands on surface 9 by adjusting the location of the UAV as it hovers in the vicinity of surface 9. The angular position of arm 3 relative to the body frame 4 of UAV 2 may also be adjusted during flight. FIG. 3B depicts the UAV 2 flying toward the surface 9 while the arm 3 is oriented generally horizontal. Changing the angle of arm 3 may be accomplished using a motor (not shown in FIGS. 3A-3D) mounted to the pivot support frame 4*a* and operatively coupled to the arm 3 by a gear train (not shown in FIGS. 3A-3D) or using a linear actuator (not shown in FIGS. 3A-3D) that has one end connected to the pivot support frame 4*a* and another end connected to the arm at a point at a distance from the pivot 5. FIG. 3C depicts the stage wherein the payload 6 is lying flat against the surface 9 of the repairable structure. FIG. 3D depicts a stage wherein the UAV 2 is flying away from the surface 9 after the payload 6 has been uncoupled from the arm 3 while in the state depicted in FIG. 3C. The uncoupled payload 6 may stay attached to the surface 9 due to attachment forces exerted by a plurality of surface attachment devices (not shown in FIGS. 3A-3D), such as magnetic-based devices, e.g., an electro-permanent magnet, for ferromagnetic structures, and/or vacuum-based, electrostatic-based, adhesive-based, or gripper-based devices for non-ferromagnetic structure.

The payload-carrying UAV 2 depicted in FIG. 2 or FIG. 3A is equally well adapted for use in repairing a wide range of structures including, but not limited to, aircraft, wind turbine blades, storage tanks, power lines, power-generating facilities, power grids, dams, levees, stadiums, large buildings, bridges, large antennas and telescopes, water treatment facilities, oil refineries, chemical processing plants, high-rise buildings, and infrastructure associated with electric trains and monorail support structures. The system is also particularly well suited for use inside large buildings such as manufacturing facilities and warehouses. Virtually any structure that would be difficult, costly, or too hazardous to be repaired by a human controlling the repair tool may potentially be repaired using the systems described herein. Various embodiments of repair payloads carried by a UAV 2 will be described in some detail below.

In accordance with one embodiment of a method for UAV-enabled repair of a limited-access structure or target object, the multi-tool-equipped UAVs disclosed in some detail below are designed to land on a surface of a structure at a location such that the UAV 2 is in proximity to the damaged area. Then the first repair tool is moved into position and activated to perform a first repair operation. Upon completion of the first repair operation, the first repair tool is moved away and a second repair is moved into position and activated to perform a second repair operation.

This process may continue until the N-th repair operation (of a scheduled procedure consisting of N repair operations, where N>2 is an integer) has been completed. Then the UAV 2 lifts off of the surface and returns to home base.

Figures 4, 4A:
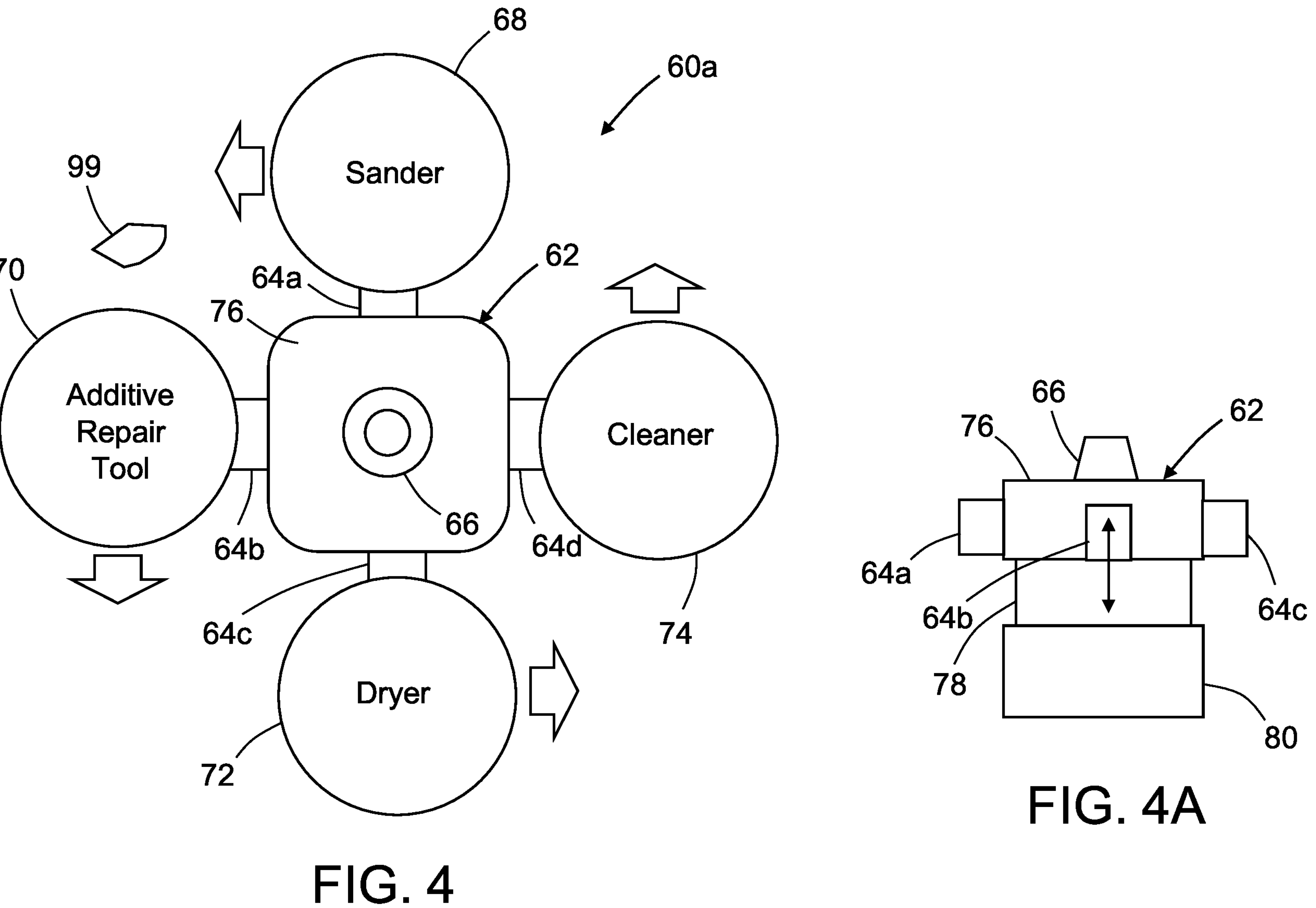
FIG. 4 is a diagram representing a top view of a multi-tool module in accordance with one embodiment, which module may be a payload carried by a UAV of the type depicted in FIG. 2 or 3A or a type having a different design.
FIG. 4A is a diagram representing a side view of some components (tools have been omitted) of the multi-tool module depicted in FIG. 4.

FIG. 4 is a diagram representing a top view of a multi-tool module 60*a* in accordance with one embodiment, which multi-tool module 60*a* may be a payload 6 carried by a UAV 2 of the type depicted in FIG. 2 or 3A or a type having a different design. The multi-tool module 60*a* includes a hub 62 which is rotatable about an axis of rotation (hereinafter "hub axis of rotation") and a hub motor (not shown in FIG. 4) operatively coupled to drive rotation (indicated by arrows in FIG. 4) of the hub 62.

The multi-tool module 60*a* further includes a plurality of tools which are connected to the hub 62 by a plurality of straight arms 64*a*-64*d* which extend radially outward at right angles relative to the hub axis of rotation. Thus, the tools rotate about the hub axis of rotation when the hub 62 and arms 64*a*-64*d* are rotated. The arms 64*a*-64*d* may be distributed at equal angular intervals. In the example depicted in FIG. 4, the multi-tool module 60*a* includes four arms 64*a*-64*d* (disposed at 0, 90, 180, and 270 degrees) and four tools mounted to the distal ends of respective arms 64*a*-64*d*, including a sander or other subtractive repair tool (hereinafter subtractive repair tool 68) attached to arm 64*a*, an additive repair tool 70 attached to arm 64*b*, a drying tool 72 attached to arm 64*c*, and a cleaning tool 74 attached to arm 64*d*. As used herein, the term "subtractive repair tool" means a tool that is configured to remove material from a body of material, whereas the term "additive repair tool" means a tool that is configured to add material to a body of material.

The multi-tool module 60*a* further includes an attachment point 66, which may be integrally formed with or attached to the capped head 76. The attachment point 66 is coupled to the payload support frame 8 during flight of the UAV 2 (see FIG. 2) and may be uncoupled from the UAV 2 after the multi-tool module 60*a* has been delivered and attached or adhered to the repair site.

FIG. 4A is a diagram representing a side view of the hub 62 (the tools have been omitted) of the multi-tool module 60*a* depicted in FIG. 4. The hub 62 is shown rotatably mounted to a base 80 of the multi-tool module 60*a*. The hub 62 is rotatable relative to the base 80 about an axis of rotation (hereinafter "hub axis of rotation"). The hub 62 includes a first hub motor (not visible in FIGS. 4 and 4A but see hub motors 26 in FIG. 7) operatively coupled to drive rotation (indicated by arrows in FIG. 4) of the hub 62. More specifically, the hub 62 includes an inner cylinder 78 which is rotatable relative to the base 80 and a capped head 76 which caps a topmost portion of the inner cylinder 78. The capped head 76 is translatable up and down relative to the topmost portion of the inner cylinder 78 as indicated by the double-headed arrow in FIG. 4A. For example, the capped head 76 may be slidably coupled to the inner cylinder 78 by means of a plurality of linear slides arranged at equal angular intervals between the cylindrical portion of the capped head 76 and the topmost portion of the inner cylinder 78 and disposed parallel to the hub axis of rotation. The hub 62 further includes a second hub motor (not visible in FIGS. 4 and 4A but see hub motors 26 in FIG. 7) operatively coupled to drive translation of the capped head 76. The plurality of arms 64*a*-64*d* have respective first ends fixedly coupled to the capped head 76; the plurality of tools are attached to respective distal (second) ends of the plurality of arms 64*a*-64*d*.

The tool-carrying arms 64*a*-64*d*—being attached to and extending radially outward from the capped head 76—are lifted, rotated, and lowered into place over the repair area in accordance with a planned sequence dictated by the nature of the repair. The arms 64*a*-64*d* may optionally be spring-loaded relative to the capped head 76 to apply downward pressure once the capped head 76 is lowered to a height where the tool contacts the surface. Since the vertical control at the attachment end of the arms 64*a*-64*d* is not independent, the tools not being used would at least touch the skin of the structure at non-repair locations. Because the tools are lifted up during each rotation, it is expected no scratching or other surface damage would occur. This is the purpose of the vertical actuation of the capped head 76. Because the primary purpose of the vertical motion of the capped head 76 is to avoid dragging the tools around on the surface, only a small range of motion is sufficient.

The hub motors 26 may be operated under computer control to rotate a first selected tool to a position vertically aligned with the damaged area and then lower the first selected tool into a position proximate to the damaged area. (It should be appreciated that during rotation or translation of any one of the four tools attached to hub 62, the other three tools also rotate or vertically translate in unison.) While in the proximate position, the first selected tool may then be activated to perform a first repair operation. When that first repair operation is complete, the hub motors 26 may be operated under computer control to raise all tools and then rotate the first selected tool away from the vertically aligned position. While the first selected tool is being rotated away from the vertically aligned position, the second selected tool is being rotated toward the vertically aligned position. Then the second selected tool is lowered to the proximate position and activated to perform the second repair operation. The repair procedure may be continued until completed by causing additional tools to be applied to the damaged area in succession by means of similar rotations and vertical translations of the capped head 76 and arms 64*a*-64*d*.

In accordance with one typical repair operation, first the subtractive repair tool 68 is moved into position to remove material from the damage site. Then the cleaning tool 74 is moved into position for directing pulses of pressurized gas to clear away any loose material on or around the area under repair. Next the additive repair tool 70 is moved into position to apply a curable material on the damaged area. Lastly, the drying tool 72 is moved into position to apply heat for curing the curable material. In one proposed implementation, the subtractive repair tool 68 is a sander and the additive repair tool 70 is a repair material applicator, such as a sprayer. For example, the subtractive repair tool 68 may include a rotary shaft (not shown in the drawings) having an abrasive head for sanding or grinding a damaged surface of a structure to prepare the surface for the application of a coating. The rotary shaft is driven to rotate by a rotary tool motor. The additive repair tool 70 includes a pump (not shown in the drawings) that pumps liquid material through a tube, out a nozzle and onto the surface of the structure within the damaged area. The pump pumps liquid out of a storage canister, through an electronically controlled valve which has been opened, through the tube and out the nozzle when a pump motor is activated. The drying tool 72 may include a heat source used for drying a surface before treatment or for curing a curable material that has been applied by the additive repair tool 70. The cleaning tool 74 may include a pressurized canister, an electromechanical control valve and a nozzle for directing pulses of pressurized gas to clear away any loose material on or around the area under repair. In accordance with one embodiment, each motorized tool receives power from a battery onboard the UAV 2 via respective wires which diverge out of a common umbilical cable (not shown in FIGS. 3A and 3B). In alternative embodiments, the multi-tool module 60*a* may include two, four or more tools. Regardless of the number of tools arrayed around the capped head 76, the projections of the arms on a plane perpendicular to the hub axis of rotation may be distributed at equal angular intervals.

Figure 5:
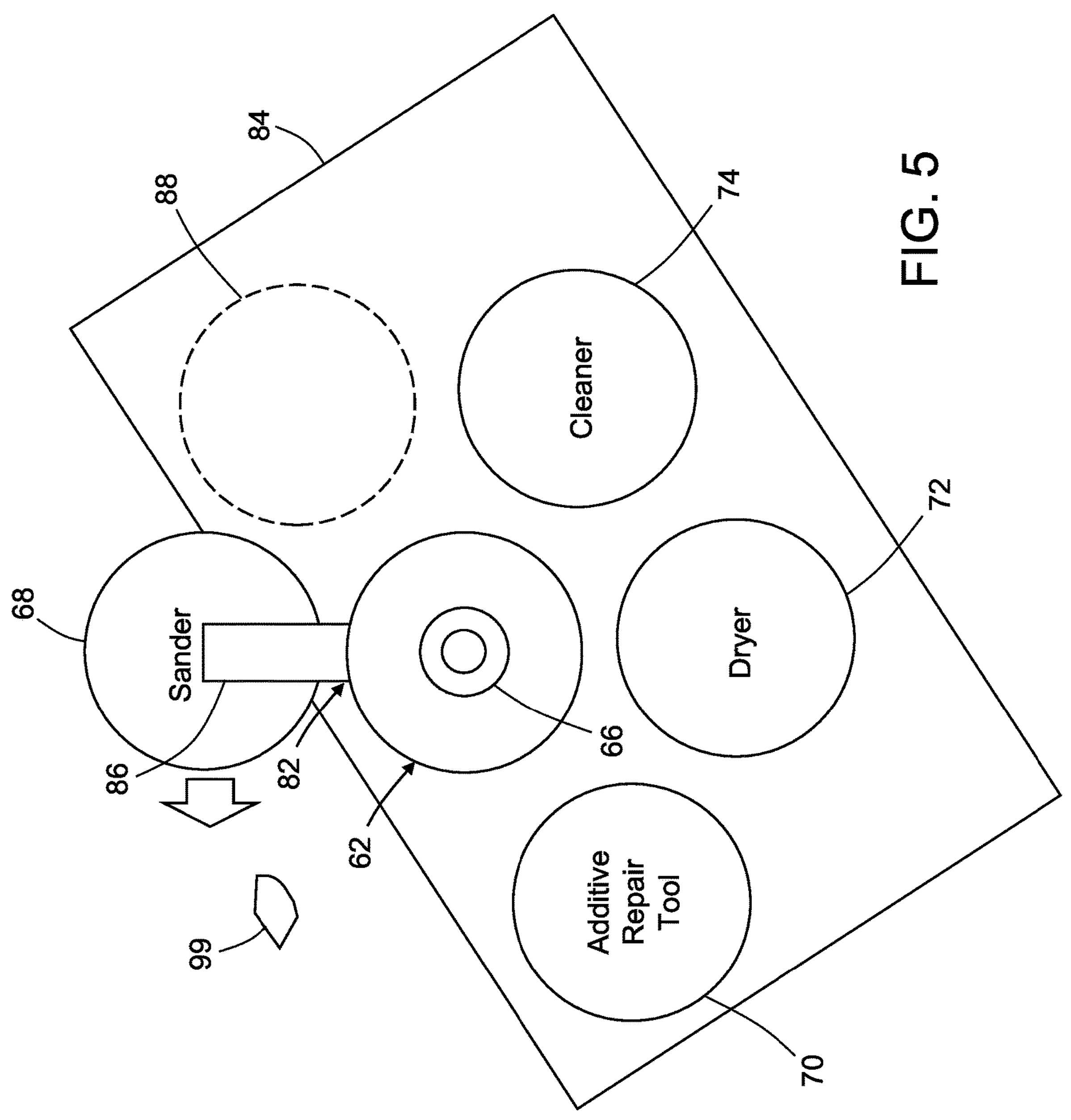
FIG. 5 is a diagram representing a top view of a tool pick-and-place module having a pick-and-place robot and a tool station platform in accordance with one embodiment, which module may be a payload carried by a UAV of the type depicted in FIG. 2 or 3A or a type having a different design. In the state depicted in FIG. 5, the pick-and-place robot is carrying one tool toward an anomaly while other tools remain at respective tool stations on the platform.

FIG. 5 is a diagram representing a top view of a tool pick-and-place module 22 in accordance with one embodiment, which module may be a payload 6 carried by a UAV 2 of the type depicted in FIG. 2 or 3A or a type having a different design. The tool pick-and-place module 22 includes a tool pick-and-place robot 82, a platform 84 comprising a plurality of tool stations 88, and a plurality of tools positioned at respective tool stations 88. The plurality of tools may include: a subtractive repair tool 68, an additive repair tool 70, a drying tool 72, and a cleaning tool 74 (which tools have been described in some detail above). In the state depicted in FIG. 5, the subtractive repair tool 68 has been removed from its assigned tool station 88 so that the tool station is visible. The tool stations assigned to the other tools 70, 72, and 74 are covered by the tools still occupying the stations and not visible in FIG. 5. The plurality of tool stations 88 are disposed at respective positions which are angularly distributed on platform 84 in a circular cylindrical frame of reference centered at an axis of rotation of the tool pick-and-place robot 82. In accordance with one embodiment, the tool pick-and-place robot 82 is attached to an upper portion of the payload support frame 8, while the platform 84 is attached to the standoff support members 18 (see FIG. 2).

The tool pick-and-place robot 82 includes a hub 62, a hub motor (now shown in FIG. 5) for driving rotation of hub 62 about the hub axis of rotation, and a tool-engaging arm 86 (hereinafter "arm 86") having a first end fixedly coupled to the hub 62 and a second (distal) end at a distance from the hub 62. The second end of arm 86 incorporates a tool holder (not shown in FIG. 5) for holding a tool during tool movement. The plurality of tools stationed at the plurality of tool stations 88 on platform 84 are disposed at least partly within a length of the arm 86 of the tool pick-and-place robot 82. In the state depicted in FIG. 5, the subtractive repair tool 68 is being held by the tool holder as the tool pick-and-place module 22 rotates the subtractive repair tool 68 toward an anomaly 99 found on the surface of the structure being repaired.

Figure 5B:
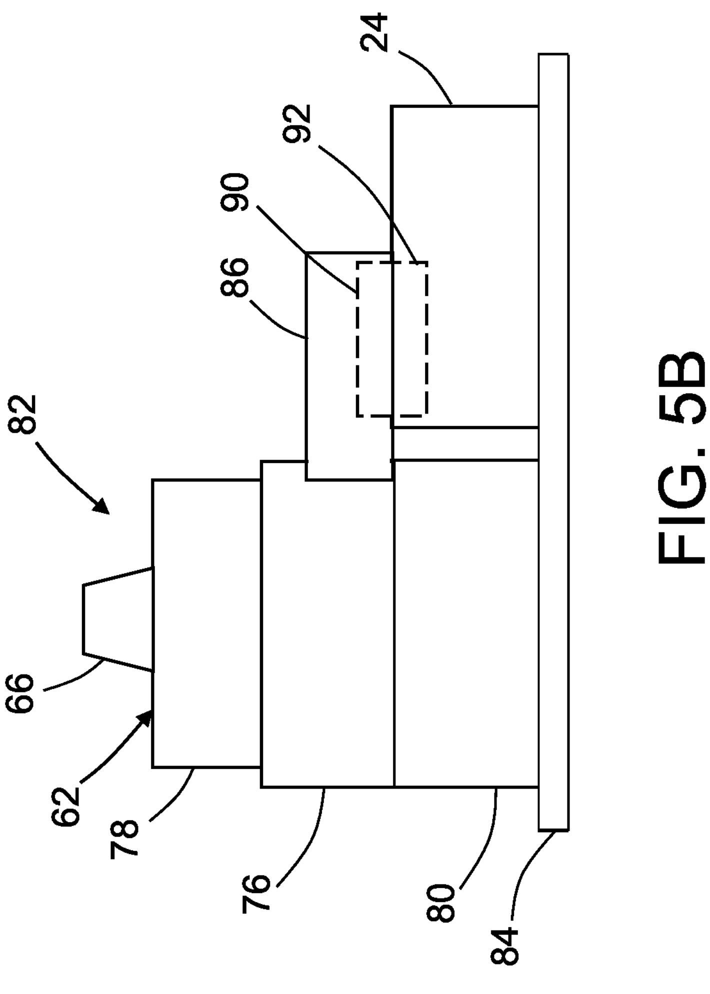
FIG. 5B is a diagram representing a side view of the tool pick-and-place robot with the arm in the lowest position and engaged with a tool disposed at a tool station.
Figure 5A:
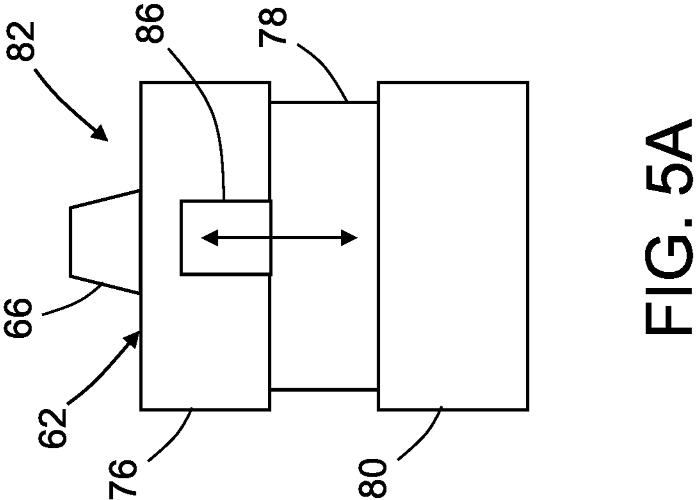
FIG. 5A is a diagram representing a side view of a tool pick-and-place robot of the type depicted in FIG. 5. The tool-engaging arm (shown in an angular position extending out of the page) is rotatable 360 degrees and vertically displaceable between highest and lowest positions. The tool-engaging arm is shown in FIG. 5A in the highest position with vertical displacement being indicated by a double-headed arrow.

FIG. 5A is a diagram representing a side view of the tool pick-and-place robot 82 depicted in FIG. 5. The hub 62 includes an inner cylinder 78 which is rotatable relative to the base 80 and a capped head 76 which is translatable up and down relative to the inner cylinder 78 as previously described with reference to FIG. 4A. The arm 86 is disposed at an angular position extending out of the page, so only the end face of the arm 86 is visible in FIG. 5. One end of arm 86 is attached to or integrally formed with the capped head 76, so that arm 86 rotates and translates as the capped head 76 rotates and translates. The arm 86 may be rotatable 360 degrees and vertically displaceable between highest and lowest positions. The arm 86 is shown in FIG. 5A in the highest position with vertical displacement being indicated by a double-headed arrow.

FIG. 5B is a diagram representing a side view of the tool pick-and-place robot 82 with the arm 86 in the lowest position and engaged with a tool 24 seated at a tool station on the platform 84. The tool 24 may be any one of the tools depicted in FIG. 5 or some other tool. The state of tool engagement depicted in FIG. 5B may occur when the tool pick-and-place robot 82 is picking up or dropping off the tool 24 at its assigned tool station 88.

In accordance with the embodiment depicted in FIG. 5B, the arm 86 of the tool pick-and-place robot 82 incorporates a tool holder in the form of an electro-magnet or electro-permanent magnet (hereinafter collectively referred to as "electro-magnet 90"). In addition, the tool 24 includes a permanent magnet 92 positioned for magnetic coupling with electro-magnet 90 when the arm 86 is lowered into contact with the tool 24. Each tool 24 on the platform 84 may incorporate a permanent magnet 92. The magnetic coupling force may be controlled by varying the electrical power supplied to the electro-magnet 90.

Electro-permanent magnets are solid-state devices that have zero static power consumption (like permanent magnets), but can be switched on and off like electromagnets. The power only needs to be applied for a brief moment to toggle the state to either on or off, which makes it more useful for applications where overall power usage is preferably low. The use of electro-permanent magnets also has the benefit that, if power is lost, the coupling is still active. The electro-permanent magnet approach requires an electrical power source, but it would only need to be energized for a brief moment to switch the magnetic field state. In accordance with alternative embodiments, the tool holder of the tool pick-and-place robot 82 may be a vacuum gripper or a mechanical clamp. In these cases, the tool 24 does not require dedicated means for interacting with the tool holder of the tool pick-and-place robot 82. In accordance with one embodiment, the tools receive electric power from a battery pack onboard the UAV 2 via the tool pick-and-place robot 82. This arrangement allows the tools be lighter in weight. In accordance with an alternative embodiment, the tools may be self-powered with individual battery packs.

Figure 6A:
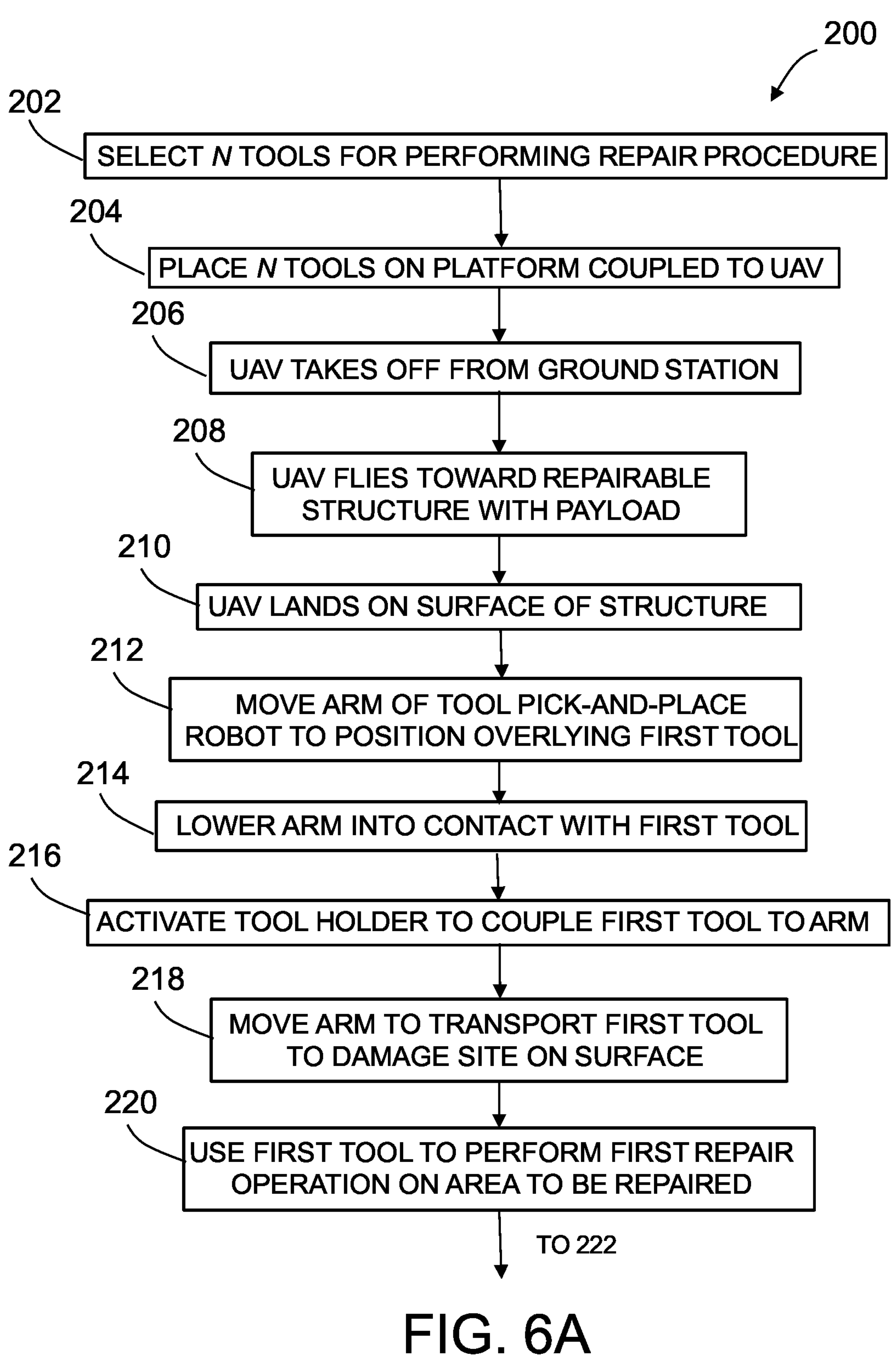
FIGS. 6A and 6B are respective parts of a flowchart identifying steps of a method for inspecting and repairing a damaged portion of a structure or object using a UAV having a tool pick-and-place robot of the type depicted in FIGS. 5A and 5B.
Figure 6B:
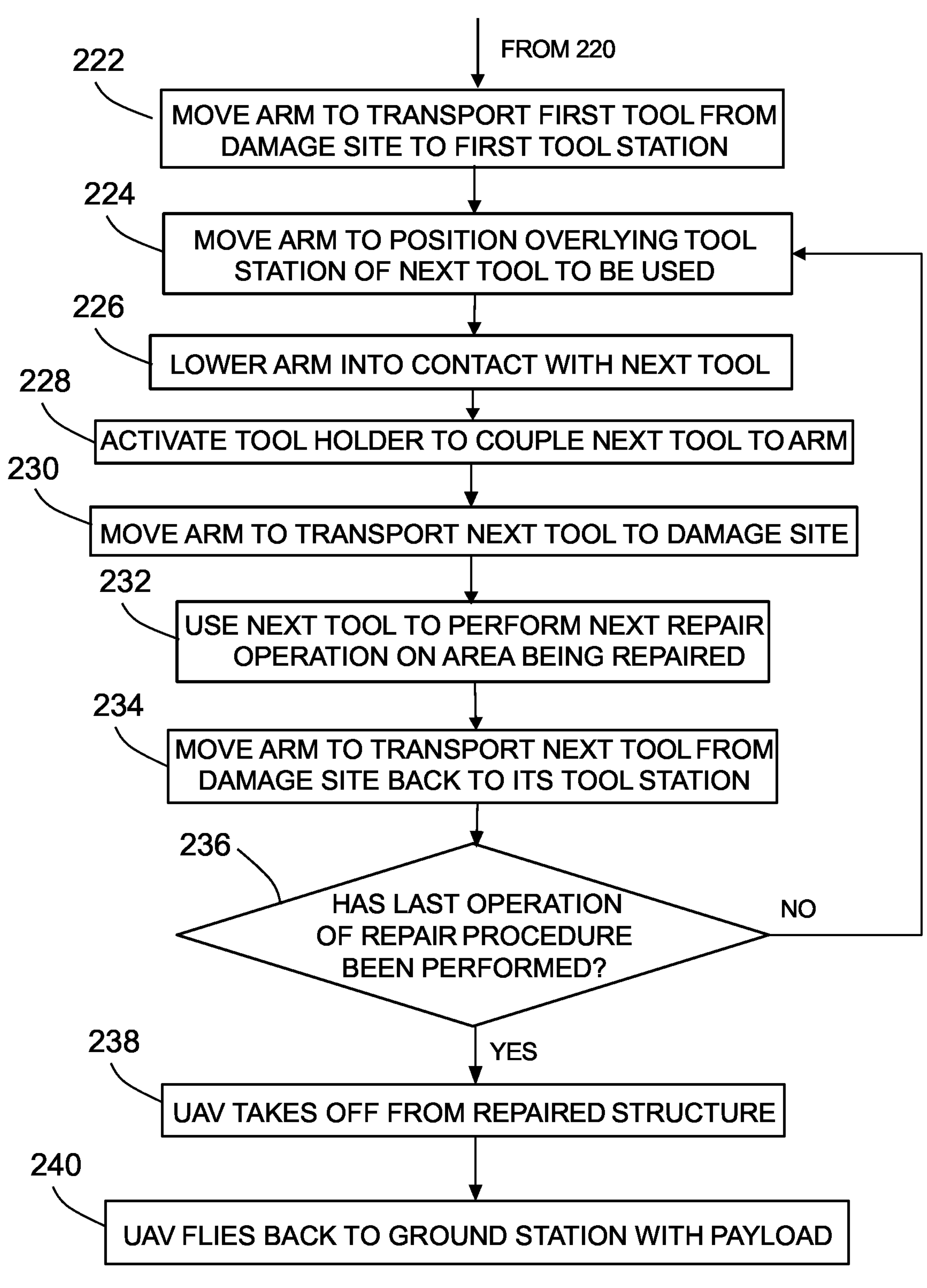

FIGS. 6A and 6B are respective parts of a flowchart identifying steps of a method 200 for inspecting and repairing a damaged portion of a structure or object using a UAV having a tool pick-and-place robot 82 of the type depicted in FIGS. 5A and 5B. Referring to FIG. 6A, the method 200 in accordance with one embodiment includes selecting N tools (where N is a positive integer greater than unity) for performing a repair procedure on a surface of a structure (step 202) and then placing the selected N tools at respective tool stations on a platform coupled to a UAV at a ground station (step 204). Then the UAV takes off from the ground station (step 206) and flies toward the structure to be repaired (also referred to herein as the "repairable structure") with the tool pick-and-place robot, platform, and N tools as payload (step 208). The UAV lands on a surface of the structure (step 210). While the UAV is parked on the surface of the structure, the arm of the tool pick-and-place robot is moved to a position overlying the tool station of the first tool to be used (step 212). Then the arm is lowered into contact with the first tool (step 214) and the tool holder is activated (step 216), thereby coupling the first tool to the arm. Then the arm is raised, rotated and lowered to transport the first tool from its tool station to a position in contact with or proximity to the damage site on the surface (step 218). The first tool is used to perform a first repair operation on the area of the surface that is need of repair (step 220). Upon completion of the first repair operation, the arm is raised, rotated and lowered to transport the first tool from the damage site back to its tool station (step 222). Then the arm of the tool pick-and-place robot is moved to a position overlying the tool station of the next tool to be used (step 224). The arm is lowered into contact with the next tool (step 226) and then the tool holder is activated (step 228), thereby coupling the next tool to the arm. Then the arm is raised, rotated and lowered to transport the next tool from its tool station to a position in contact with or proximity to the damage site (step 230). The next tool is used to perform the next repair operation on the area being repaired (step 232). Upon completion of the next repair operation, the arm is raised, rotated and lowered to transport the next tool from the damage site back to its tool station (step 234). The robot controller then determines whether the last operation of the planned repair procedure has been performed or not (step 236). If a determination is made in step 236 that the last repair operation has not been completed, then the process returns to step 224. If a determination is made in step 236 that the last repair operation has been completed, the UAV takes off from the repaired structure (step 238) and then flies back to the ground station (step 240).

Figure 7:
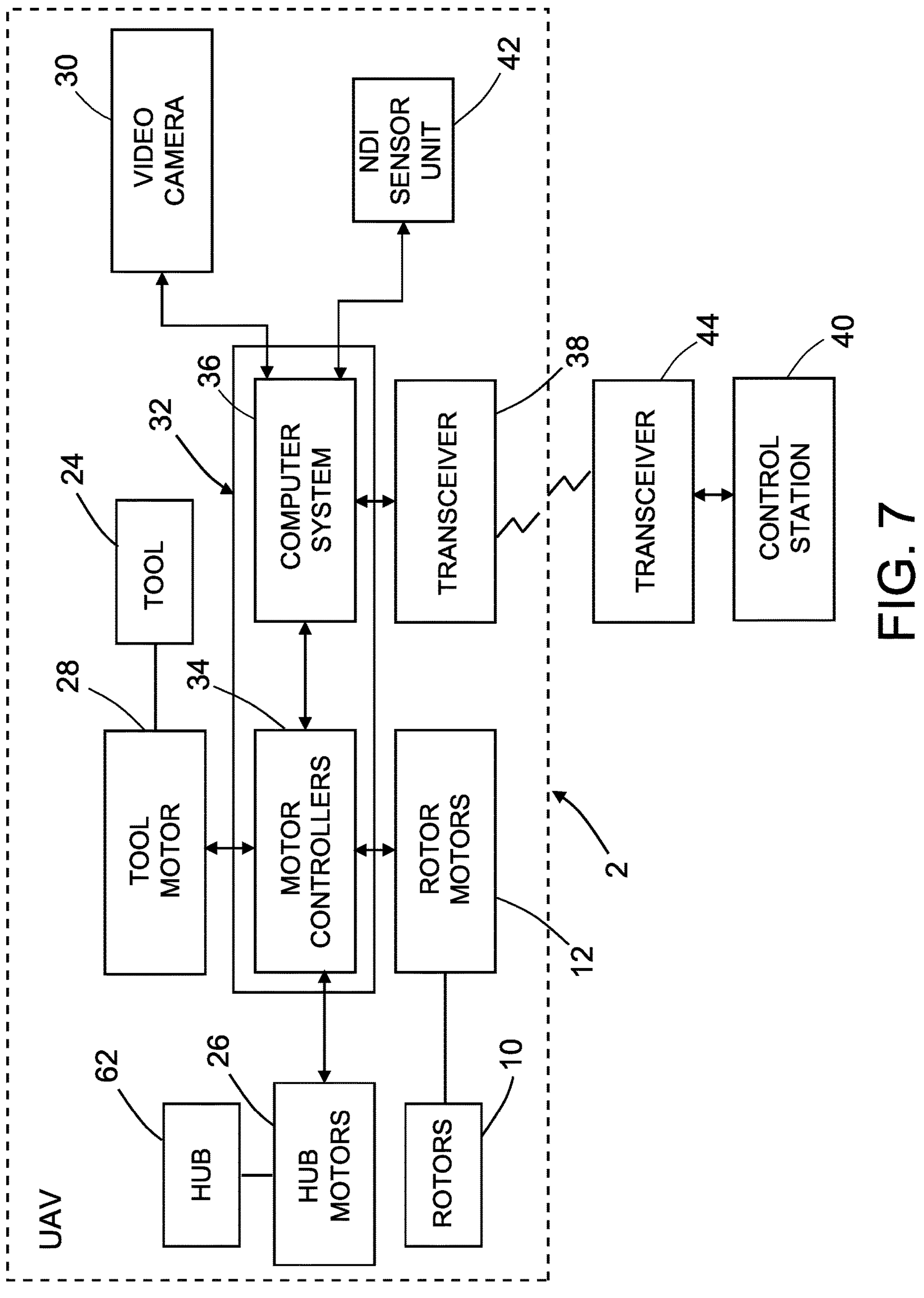
FIG. 7 is a block diagram identifying some components of a system for inspecting and repairing a structure using a UAV that is equipped with a plurality of tools which are individually deployable in a planned sequence through control of a motorized hub.

FIG. 7 is a block diagram identifying some components of a system for inspecting and repairing a structure using a UAV 2 that is equipped with a plurality of tools 24 which are individually deployable in a planned sequence through control of rotation of hub 62. In accordance with the embodiment depicted in FIG. 7, the UAV 2 is also equipped with a video camera 30 and a non-destructive inspection sensor unit 42 (hereinafter "NDI sensor unit 42"). The UAV 2 has a control system 32 that controls rotations of the rotors 10, any rotatable components of tool 24, and inner cylinder 78 of hub 62 and further controls translation of capped head 76 relative to inner cylinder 78. The control system 32 also controls operation of the video camera 30, NDI sensor unit 42, and other electrically operable components of tool 24 (such as solenoids).

More specifically, the control system 32 includes a computer system 36 which is communicatively coupled to a plurality of motor controllers 34. The motor controllers 34 are respectively configured for controlling the rotational speed and direction of rotor motors 12 (which drive rotation of rotors 10), hub motors 26 (which drive rotation of inner cylinder 78 and translation of capped head 76), and a tool motor 28 (which drives rotation or other operation of tool 24). The operation of these motors is coordinated by the computer system 36 to perform the particular planned sequence of repair operations. In one proposed implementation, the motor controllers 34 are electronic speed control circuits configured to vary an electric motor's speed, direction and braking, while the motors are brushless electric motors. Such electronic speed control circuits provide high-frequency, high-resolution three-phase AC power to the motors.

If the video camera 30 is mounted to a turret (not shown in FIG. 7), then the control system 32 also includes a motor controller for controlling the rotational speed and direction of a camera turret motor (also not shown in FIG. 7). Such a camera turret may be rotatably coupled to a turret base mounted to the body frame 4 of the UAV 2. This allows the video camera 30 to capture respective images during different phases of a remote inspection/repair task. The images are wirelessly transmitted to the maintenance operations center, thereby enabling maintenance personnel to observe the damaged area on the structure during NDI and repair operations.

In the embodiment partly depicted in FIG. 7, the video camera 30 and NDI sensor unit 42 are controlled by the computer system 36 as a function of radiofrequency commands transmitted by a control station 40. Those radiofrequency commands are transmitted by a transceiver 44 on the ground, received by a transceiver 38 on-board the UAV 2, and converted by the transceiver 38 into the proper digital format. The resulting digital commands are then forwarded to the computer system 36. The control station 40 may comprise a general-purpose computer system configured with programming for controlling operation of the UAV 2 and the NDI sensor unit 42 on-board the UAV 2. For example, the flight of the UAV 2 can be controlled using a joystick, keyboard, mouse, touchpad, or touchscreen of a computer system at the control station 40 or other user interface hardware (e.g., a gamepad or a pendant). In addition, the computer system at the control station 40 is configured with programming for processing data received from the UAV 2 during an inspection operation. In particular, the computer system of the control station 40 may comprise a display processor configured with software for controlling a display monitor (not shown in FIG. 7) to display images acquired by the video camera 30.

As previously described, following completion of the non-destructive evaluation, a determination (diagnosis) may be made that a UAV-enabled repair is called for. In that event, the UAV 2 is flown to the damage site on the surface of a structure or object, equipped with an ensemble of tools configured to perform the separate operations involved in the planned repair. The UAV operator guides the UAV 2 to position a repair tool 24 onto the target region. The repair tool-equipped UAV may also have surface attachment devices (not shown in FIG. 7), such as magnetic-based devices, e.g., an electro-permanent magnet, for ferromagnetic structures, and/or vacuum-based, electrostatic-based, adhesive-based, or gripper-based devices for non-ferromagnetic structure. The surface attachment devices also operate under the control of the computer system 36. The computer system may include separate computers respectively mounted to the UAV 2 and to the multi-tool module **60*a*** and mutually communicatively coupled via an electrical cable.

Figure 8:
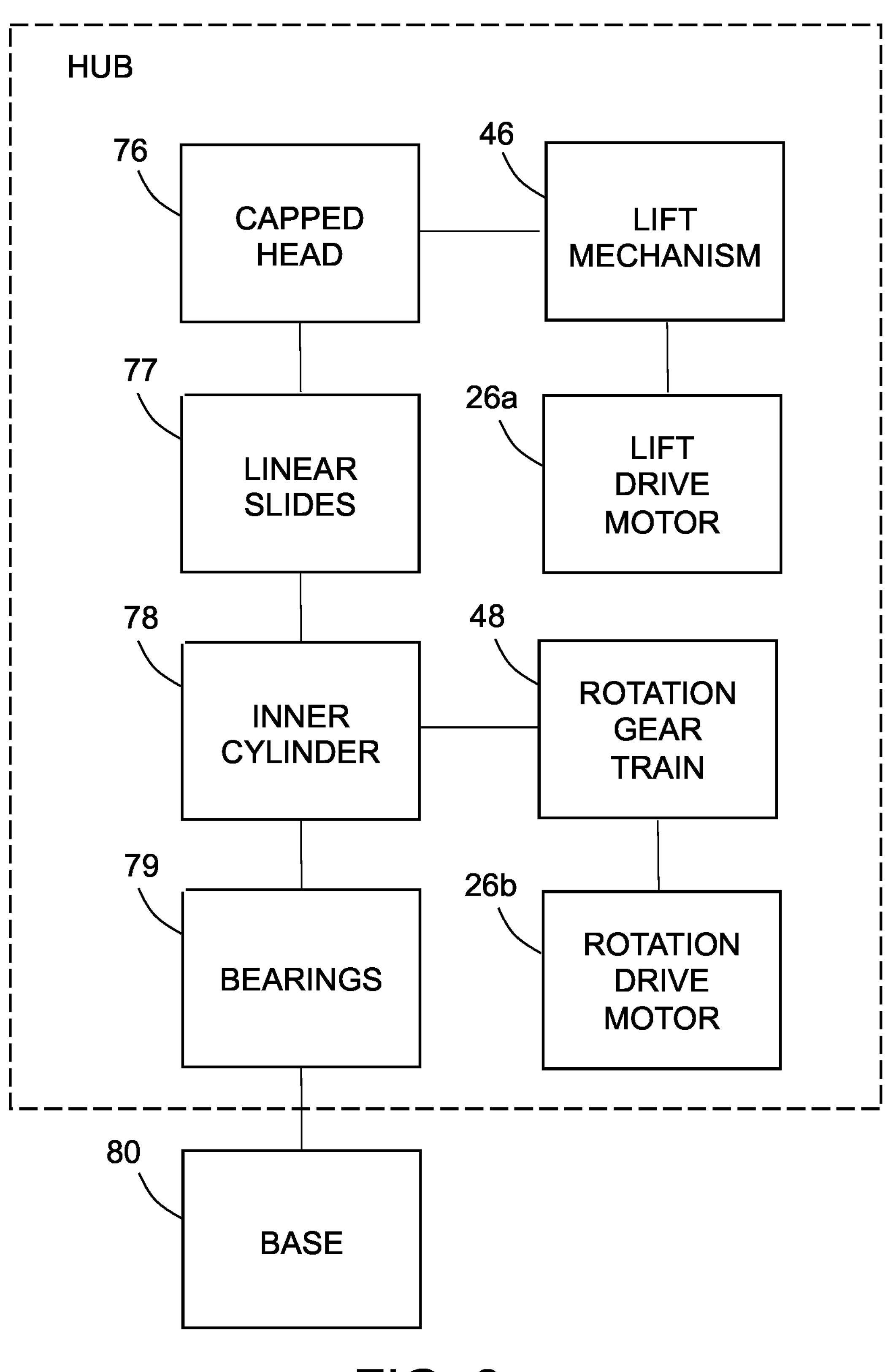
FIG. 8 is a block diagram identifying some components of a motorized hub in accordance with one embodiment that includes an inner cylinder which is rotatable relative to a base and a tool-carrying capped head which is translatable relative to the inner cylinder.

FIG. 8 is a block diagram identifying some components of a motorized hub 62 in accordance with one embodiment that includes an inner cylinder 78 which is rotatable relative to a base 80 and a tool-carrying capped head 76 which is translatable relative to the inner cylinder 78. The inner cylinder 78 is rotatably coupled to the base 80 by means of bearings 79. The capped head 76 is translatably coupled to the inner cylinder 78 by means of linear slides 77. In addition, the hub 62 includes a lift drive motor **26*a* and a rotation drive motor 26*b*. The inner cylinder 78 is operatively coupled to the rotation drive motor 26*b* by means of a rotation gear train 48. The capped head 76 is operatively coupled to the lift drive motor 26*a* by means of a lift mechanism 46. The lift mechanism 46 may include a rack and pinion gear, a lead screw and nut, or other mechanism for raising the capped head 76 so that the tools connected thereto do not contact and thereby scratch the surface of the structure being repaired during hub rotation. When a selected tool is vertically aligned with the damaged area to be repaired, the lift drive motor 26*a* is reversed to cause the lift mechanism 46** to lower the tool into contact with the surface being repaired.

Figure 9:
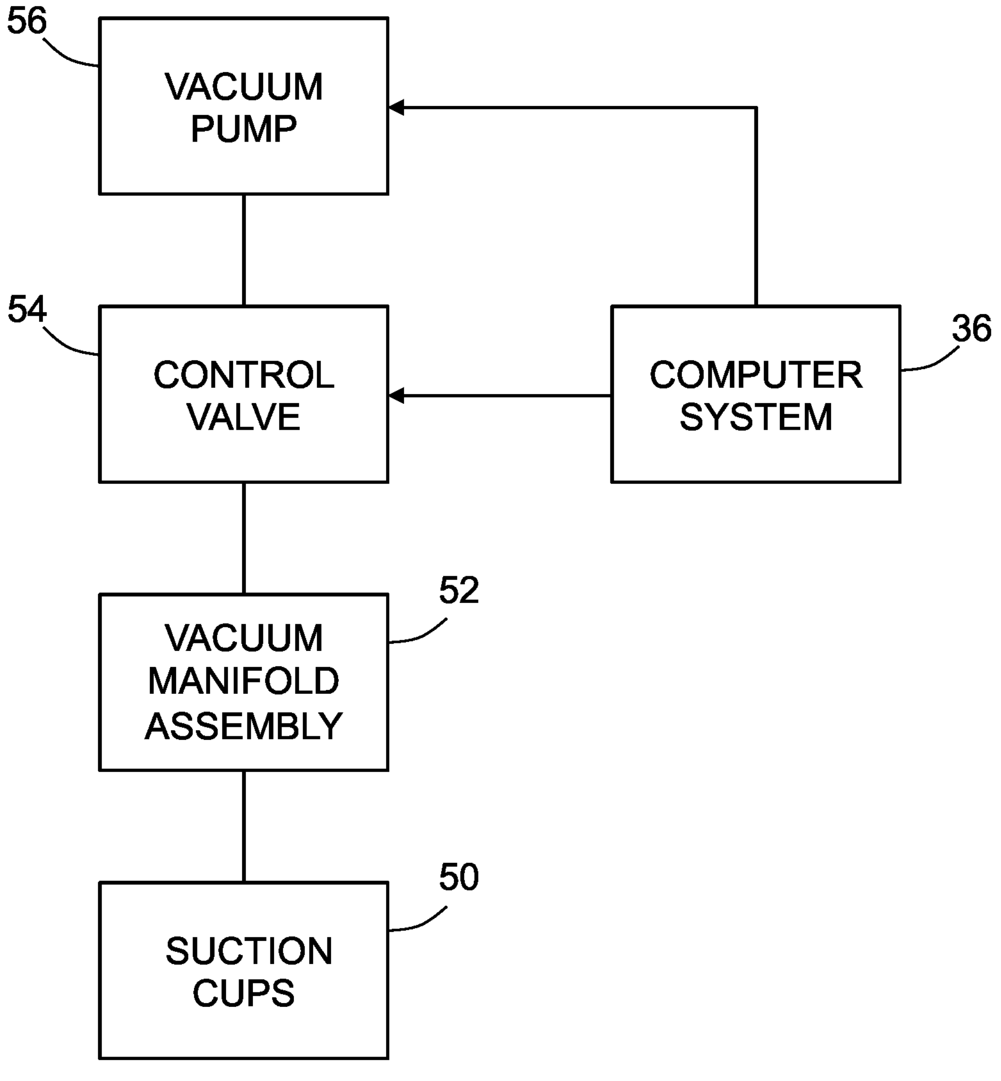
FIG. 9 is a block diagram identifying some components of a system for holding a UAV in a stable position on a surface of a structure using suction cups.

FIG. 9 is a block diagram identifying some components of a system for holding (temporarily attaching) a multi-tool module in a stable position on a surface of a structure using a vacuum adherence system. The vacuum adherence system includes plurality of suction cups 50, a vacuum manifold assembly 52, an electromechanical (e.g., solenoid-actuated) control valve 54 (hereinafter "control valve 54"), and a vacuum pump 56. The vacuum pump 56 is in fluid communication with a first port of control valve 54; the vacuum manifold assembly 52 is in fluid communication with a second port of control valve 54. The plurality of suction cups 50 are in fluid communication with the vacuum manifold assembly 52. The term "manifold" is used herein in the sense of a chamber or duct having several outlets through which a fluid can be distributed or gathered. These manifolds connect channels in the suction cups 50 to the vacuum system comprising vacuum pump 56 and control valve 54. In accordance with alternative embodiments, each individual suction cup 50 has a respective vacuum motor (not shown).

The computer system 36 (previously described with reference to FIG. 7) is further configured to control the state of control valve 54, which selectively connects vacuum pump 56 to vacuum manifold assembly 52. The vacuum manifold assembly 52 comprises a plurality of vacuum manifolds which are in fluid communication with respective suction cups 50. The computer system 36 may be programmed to send a control signal that causes the control valve 54 to open. In the valve open state, the computer system 36 also sends a control signal to activate the vacuum pump 56. The vacuum pump 56 applies a vacuum pressure to the vacuum manifold assembly 52 that causes the suction cups 50 to vacuum adhere to the surface of the repairable structure. The vacuum pump 56 needs to maintain constant vacuum pressure. In accordance with one proposed implementation, the vacuum pump 56 does not operate continuously; instead the vacuum pump 56 continuously monitors the vacuum pressure under the suction cups 50 and activates every time the vacuum pressure falls below a specified threshold. The system will attempt to maintain a pressure differential of about 1 to 2 psi below atmospheric pressure.

The embodiment described above with reference to FIGS. 4 and 4A has tools mounted to the distal ends of cantilevered arms which are fixedly coupled to a capped head 76 which is translatable along the inner cylinder 78. In alternative embodiments, the capped head 76 may be fixedly coupled to the inner cylinder 78 and a plurality of rotatable arms may be pivotably coupled to the capped head 76 to enable the tools to be raised and lowered.

Figure 10A:
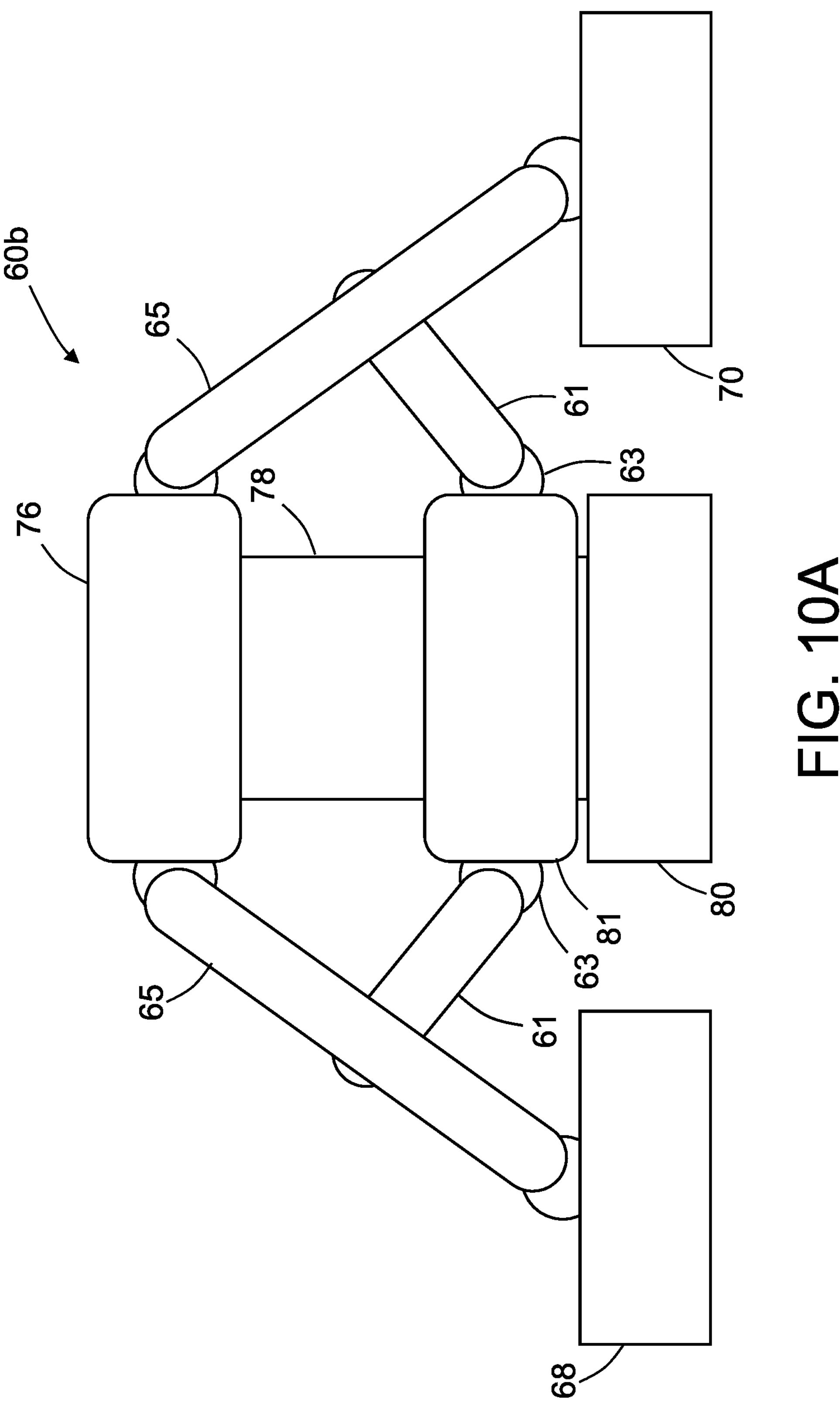
FIGS. 10A and 10B are diagrams representing side views of a multi-tool module with retractable tool-carrying arms in accordance with an alternative embodiment, which module may be a payload carried by a UAV of the type depicted in FIG. 2 or 3A or a type having a different design. The multi-tool module is shown in two states: with tool-carrying arms extended (see FIG. 10A) and with tool-carrying arms retracted (see FIG. 10B)
Figure 10B:
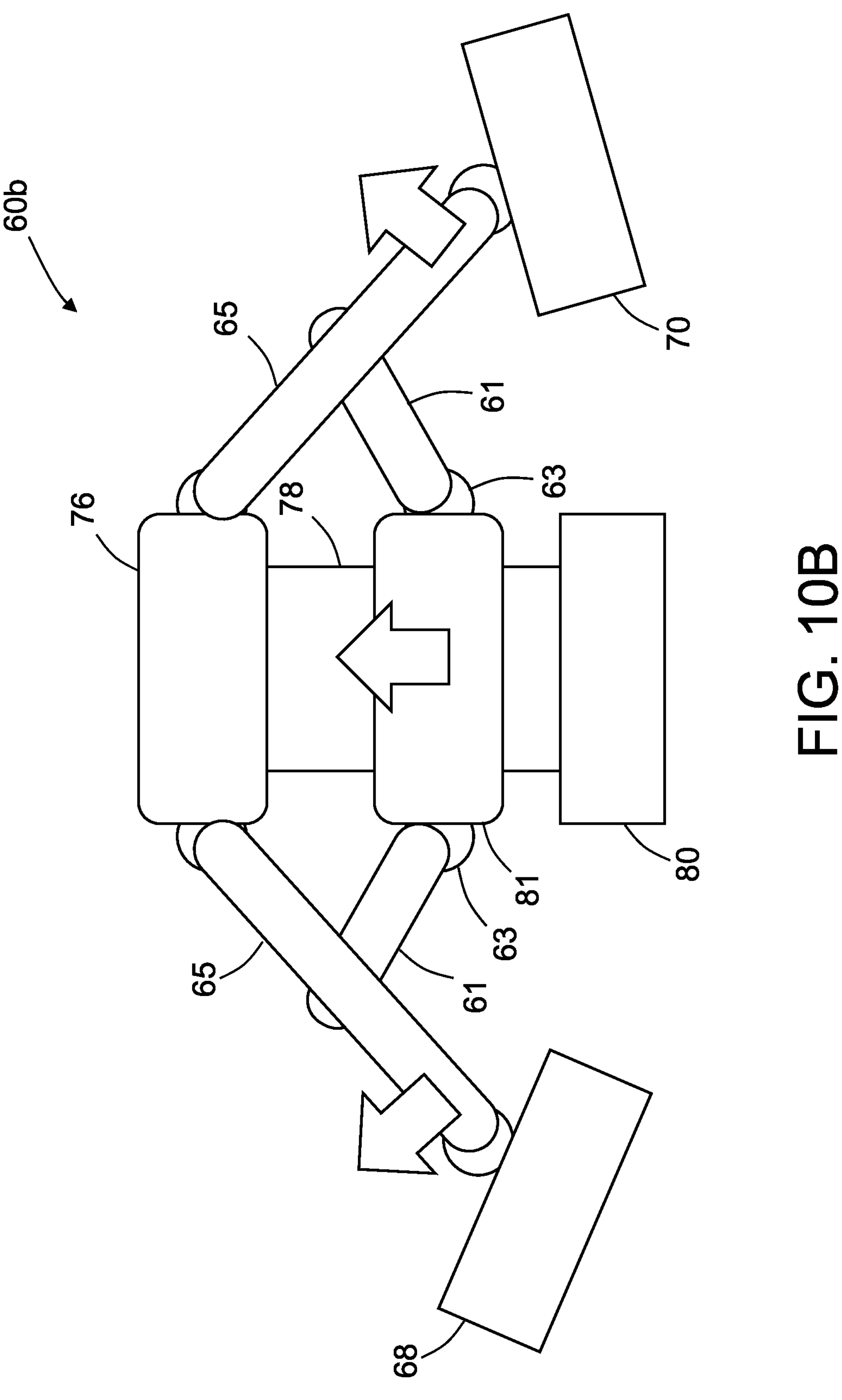

FIGS. 10A and 10B are diagrams representing side views of a multi-tool module 60*b* with rotatable arms 65 in accordance with an alternative embodiment, which module may be a payload carried by a UAV of the type depicted in FIG. 2 or 3A or a type having a different design. The multi-tool module is shown in two states: with rotatable arms 65 extended (see FIG. 10A) and with rotatable arms 65 retracted (see FIG. 10A). In the example depicted in FIGS. 10A and 10B, only two rotatable arms 65 are shown, one carrying a subtractive repair tool 68 and the other carrying an additive repair tool 70. However, the multi-tool module 60*b* may have more than two rotatable arms 65.

The multi-tool module 60*b* further includes a center ring 81 which is translatable along the inner cylinder 78. The center ring 81 is connected to the rotatable arms 65 by respective links 61. Each link 61 has one end pivotably coupled to a respective lug 63 of the center ring 81 and another end pivotably coupled to a respective rotatable arm 65. The multi-tool module 60*b* further includes a lifting mechanism (disposed inside the inner cylinder 78 and not visible in FIGS. 10A and 10B) which, when activated, causes the center ring 81 to move upward (which movement is indicated by an upward arrow in FIG. 10B). As the center ring 81 rises from the lowermost position depicted in FIG. 10A to the higher position depicted in FIG. 10B, the lifting force produced by the lifting mechanism is transferred to the rotatable arms 65 by means of the links 61. The resulting upward rotation of the rotatable arms 65 raises the tools away from the surface. While the tools are uplifted as seen in FIG. 10B, the inner cylinder 78 may be rotated until a selected tool is properly vertically aligned with the damaged area. Then the tools may be lowered by translating the center ring 81 downward, back to the lowermost position seen in FIG. 10A.

Figure 11:
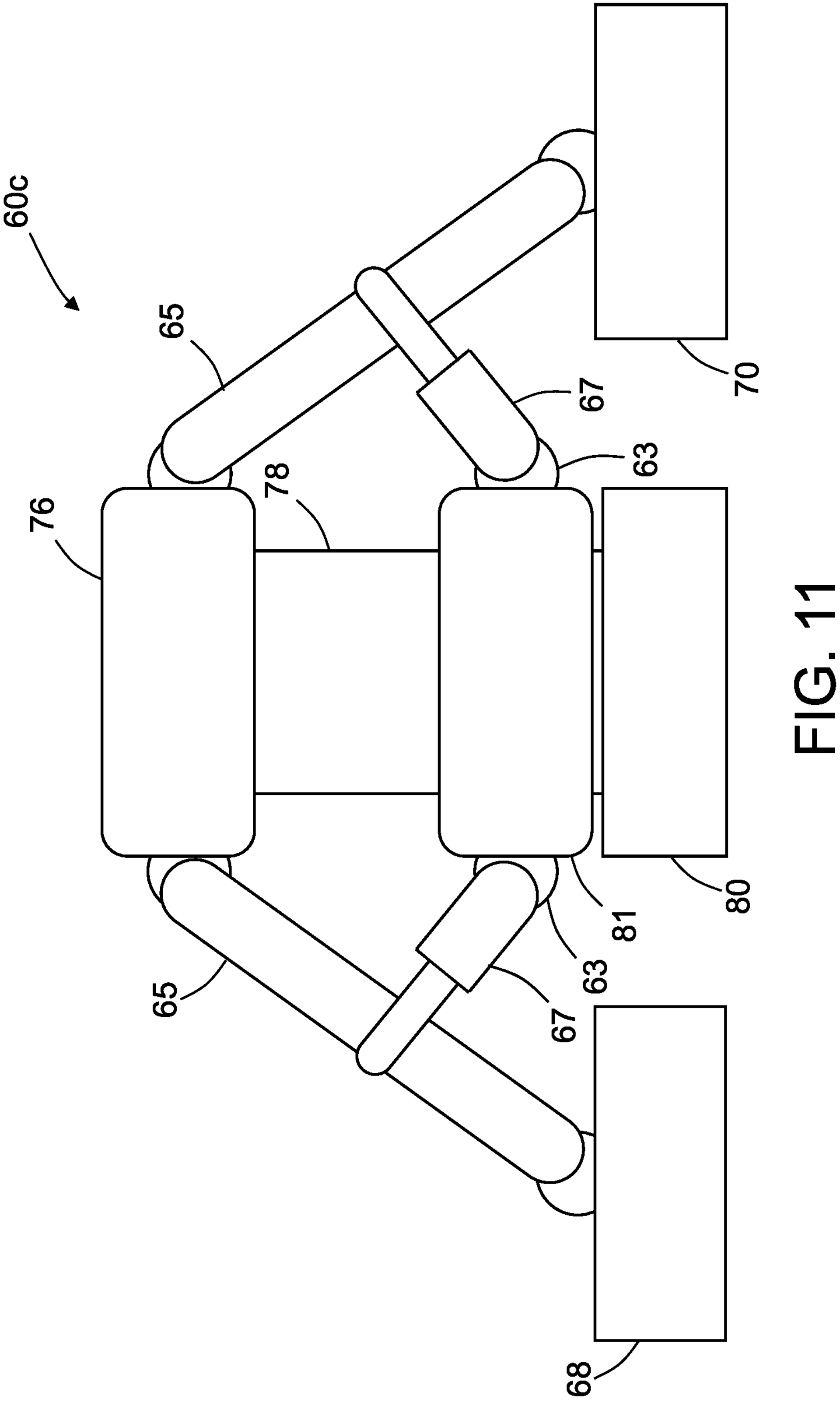
FIG. 11 is a diagram representing a side view of a multi-tool module with retractable tool-carrying arms in accordance with another embodiment. The tool-carrying arms are shown in an extended state.

Because all rotatable arms 65 are coupled to the center ring 81, all arms move in unison when the center ring 81 is moved. In accordance with other embodiments, the rotatable arms 65 may be raised and lowered independently. FIG. 11 is a diagram representing a side view of a multi-tool module 60*c* with rotatable arms 65 that may be retracted (raised) independently by respective linear actuators 67. In accordance with one proposed implementation, each linear actuator 67 has a cylinder pivotably coupled to a respective lug 63 of the inner cylinder 78 and a piston rod end pivotably coupled to a respective rotatable arm 65. Each rotatable arm 65 swings upward when the associated linear actuator 67 is extended.

Figures 12, 12A:
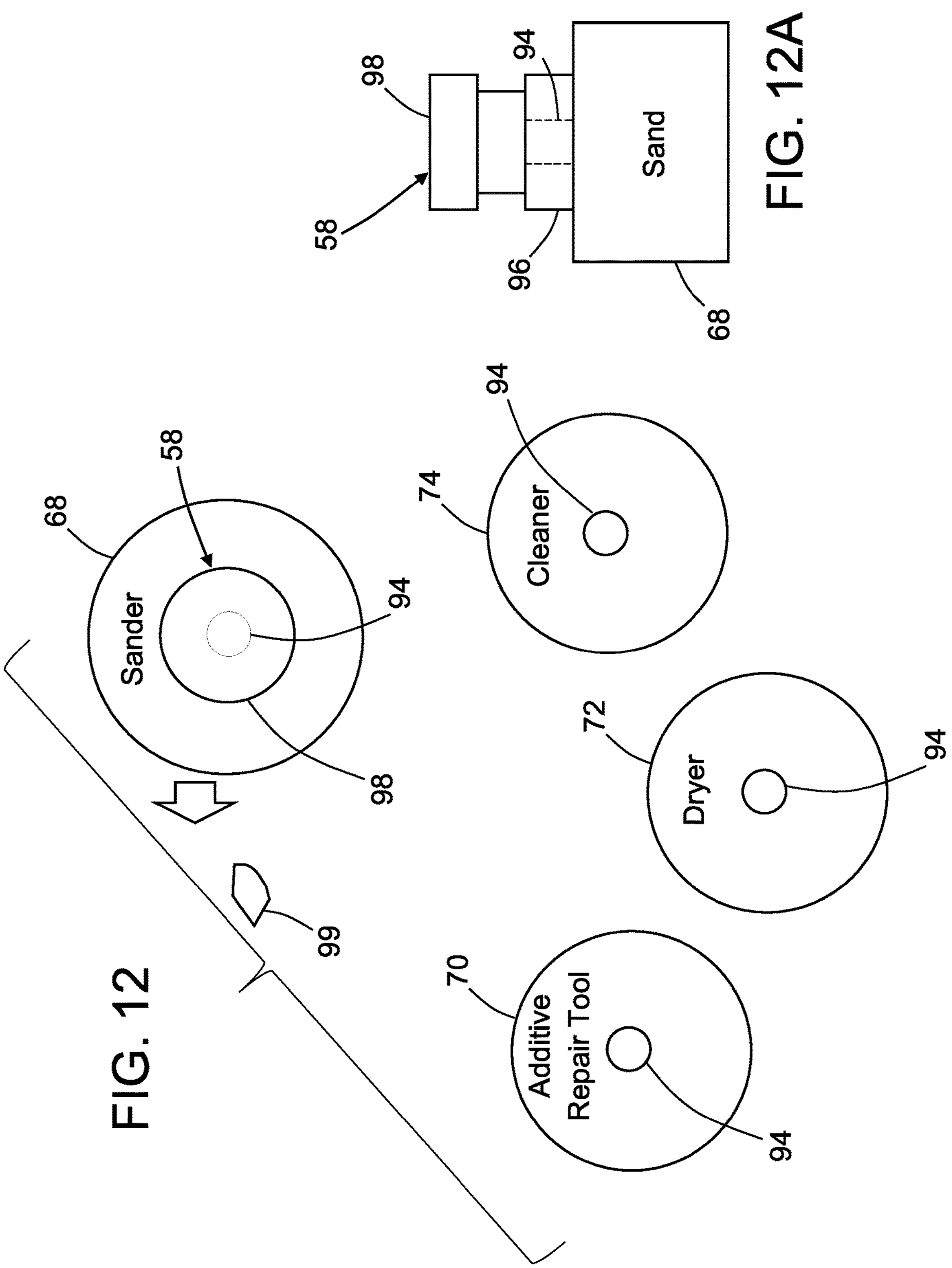
FIG. 12 is a diagram representing a top view of a tool being held by a collet module which is being carried toward an anomaly on a surface of a structure while other tools are disposed at respective tool stations on the ground. The collet module may be part of a payload carried by a UAV of the type depicted in FIG. 2 or 3A or a type having a different design.
FIG. 12A is a diagram representing a side view of the collet module engaged with a tool as depicted in FIG. 12.

In accordance with a further embodiment, the UAV 2 may be provided with a collet module designed to hold only a single tool of a plurality of interchangeable tools instead of holding multiple tools concurrently. FIG. 12 is a diagram representing a top view of a subtractive repair tool 68 (e.g., a sanding tool) being held by a collet module 58 while being carried toward an anomaly 99 on a surface of a structure. Other tools 70, 72 and 74 (previously described) are disposed at respective tool stations on the ground. The collet module 58 may be part of a payload 6 carried by a UAV 2 of the type depicted in FIG. 2 or 3A or a type having a different design. FIG. 12A is a side view of the collet module 58 engaged with the subtractive repair tool 68 as depicted in FIG. 12.

As shown in FIG. 12A, the collet module 58 includes a collet mounting plate 98 for attachment to a payload support frame 8 and a collet 96. Each tool has an attachment post 94 which may be gripped or clamped by the collet 96. While the collet 96 is open, the UAV 2 may be flown to a position overlying and aligned with the attachment post 94 of a tool and then the UAV 2 descends until the open collet 96 surrounds the attachment post 94. Then the collet 96 is closed to form a collar around the attachment post 94 and exert a clamping force to hold the tool. The collet 96 opens or closes in response to rotation of the output shaft of a motor (not shown in FIGS. 12 and 12A) in one direction or the opposite direction respectively. The attachment post 94 and collet 96 may have interlocking grooves and projections which enable the collet 96 to hold the attachment post 94.

Figure 13A:
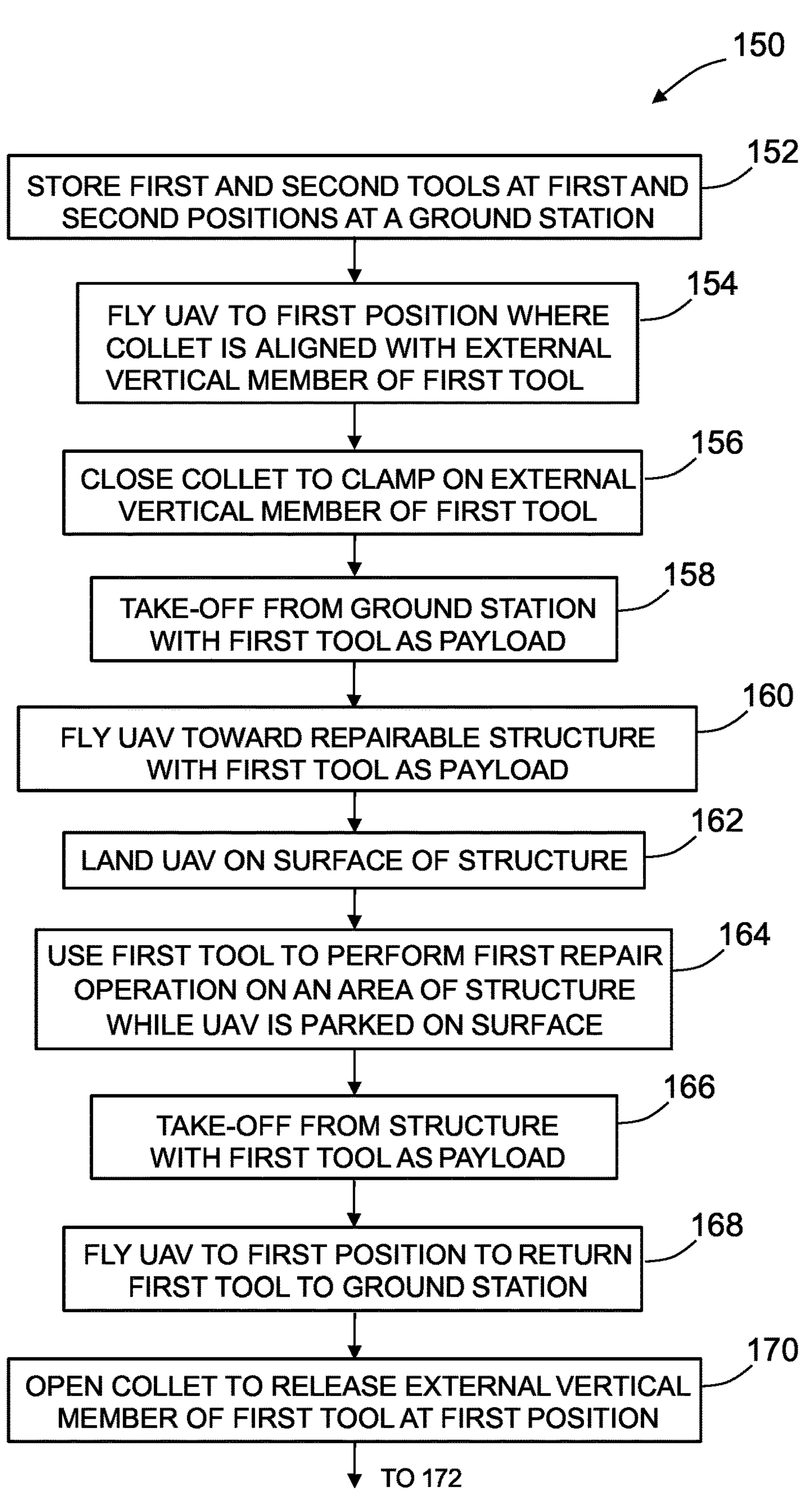
FIGS. 13A and 13B are respective parts of a flowchart identifying steps of a method for inspecting and repairing a damaged portion of a structure or object using a UAV having a collet module of the type depicted in FIG. 12A.
Figure 13B:
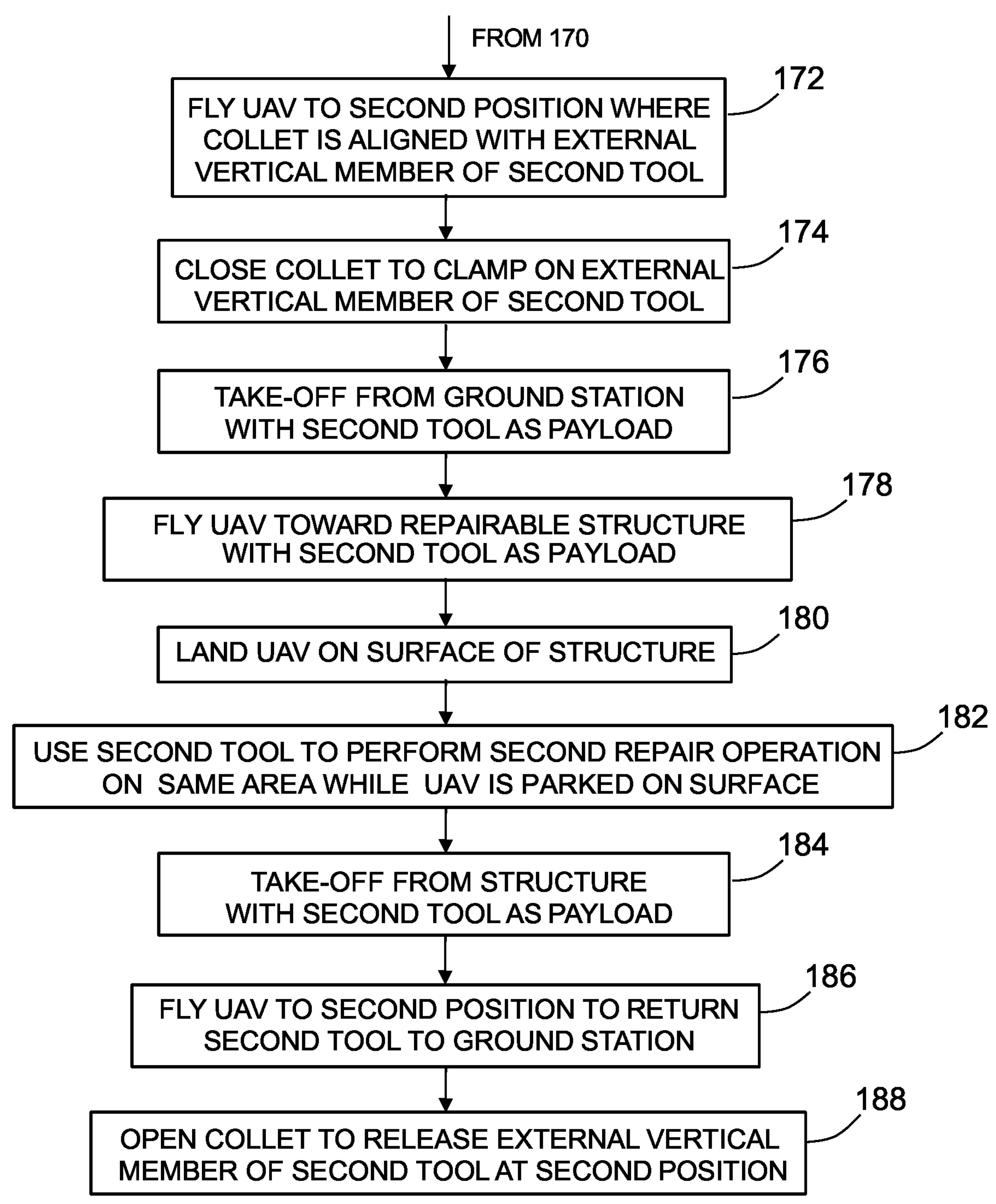

FIGS. 13A and 13B are respective parts of a flowchart identifying steps of a method 150 in accordance with one embodiment for inspecting and repairing a damaged portion of an structure or object using a UAV 2 having a collet 96 as depicted in FIG. 12A. Referring to FIG. 13A, initially first and second tools are stored at a ground station (step 152). Each of the first and second tools comprises a respective attachment post 94. The UAV assigned to perform the repair procedure is flown to a first position where the collet 96 is aligned with the attachment post 94 of the first tool (step 154). Then the collet 96 is closed to clamp on the attachment post 94 of the first tool (step 156). The UAV then takes off from the ground station with the first tool as payload 6 (step 158). The UAV then flies toward the repairable structure (step 160) and lands on a surface of the structure (step 162). While the UAV is parked on the surface of the structure, the first tool is used to perform a first repair operation on an area on the surface that is need of repair (step 164). Upon completion of the first repair operation, the UAV takes off from the repairable structure (step 166) and then flies back to the first position at the ground station while still carrying the first tool (step 168). While at the first position, the collet 96 is opened to release the attachment post 94 of the first tool (step 170).

Referring now to FIG. 13B, after returning the first tool to its storage spot, the UAV flies to a second position where the collet 96 is aligned with the attachment post 94 of the second tool (step 172). The collet 96 is then closed to clamp on the attachment post 94 of the second tool (step 174). The UAV then takes off again from the ground station (step 176), flies toward the repairable structure (step 178), and lands on the surface of the structure at the same place as before (step 180). While the UAV is parked on the surface of the structure, the second tool is used to perform a second repair operation on the same area where the first repair operation was performed (step 182). Upon completion of the second repair operation, the UAV takes off from the repairable structure (step 184) and then flies back to the second position at the ground station with the second tool as payload 6 (step 186). While at the second position, the collet 96 is opened to release the attachment post 94 of the second tool (step 188). After returning the second tool to its storage spot, the UAV proceeds to its next destination.

In accordance with some embodiments, the UAV-enabled repair system proposed herein also includes an off-board tracking system for vehicle and repair tool localization, which system may be communicatively coupled to the aforementioned control station 40 on the ground. More specifically, the off-board tracking system is configured to provide three-dimensional (3-D) localization information for navigation and control of the UAV relative to the target object and for accurately locating the inspection or repair tool in the frame of reference of the target object and correlating the location data with a 3-D model of the target object. Accurate location tracking for UAV-based repair will enable the UAV to move a repair module to the proper location and record the 3-D coordinate data associated with that location. This 3-D information is important for documenting the repair, as well as enabling accounting for the results of a previously performed UAV-enabled inspection. Any one of various techniques may be used to provide the information necessary to record the 3-D location of the activity.

In accordance with one embodiment, the UAV includes an onboard tracking system that is able to navigate the UAV in accordance with a preprogrammed flight plan. The preprogrammed flight plan carried by UAV enables the UAV to follow a flight path around a portion of the target object. The system further includes an off-board tracking system having means for wireless communication with the UAV. The off-board tracking system is configured to send commands to or monitor various operating performance parameters of the UAV, such as fuel remaining, battery power remaining, etc. The off-board tracking system may also be used generate commands to alter the flight path of the UAV based on acquired localization data.

In accordance with one embodiment, 3-D localization may be accomplished by placing optical targets on the UAV 2 and then using motion capture feedback control to calculate the location of the UAV 2. Closed-loop feedback control using motion capture systems is disclosed in detail in U.S. Pat. No. 7,643,893, the disclosure of which is incorporated by reference herein in its entirety. In accordance with one embodiment, the motion capture system is configured to measure one or more motion characteristics of the UAV 2 during a repair mission. A processor receives the measured motion characteristics from the motion capture system and determines a control signal based on the measured motion characteristics. A position control system receives the control signal and continuously adjusts at least one motion characteristic of the UAV 2 in order to maintain or achieve a desired motion state. The UAV 2 may be equipped with optical targets in the form of passive retro-reflective markers. The motion capture system, the processor, and the position control system comprise a complete closed-loop feedback control system.

In accordance with an alternative embodiment, location tracking of the UAV 2 may be implemented using a local positioning system (not shown in the drawings) mounted on or near the target object. The local positioning system may be controlled from the ground and used to track the location of a UAV 2 having three or more optical targets thereon. A typical local positioning system comprises: a pan-tilt mechanism; a camera mounted to the pan-tilt mechanism; and a laser range meter for projecting a laser beam along an aim direction vector to the target. The pan-tilt mechanism comprises a pan unit and a tilt unit. The camera comprises a housing to which the laser range meter is mounted. The camera may comprise a still camera (color and/or black and white) to obtain still images, a video camera to obtain color and/or black and white video, or an infrared camera to obtain infrared still images or infrared video of the target. The local positioning system further comprises a computer system which is configured to measure coordinates of the optical targets in the local coordinate system of the target object. In particular, this computer system is programmed to control motions of the pan-tilt mechanism to rotationally adjust the camera to selected angles around the vertical, azimuth (pan) axis and the horizontal, elevation (tilt) axis. The computer system is also programmed to control operation of the camera and receive image data therefrom for transmission to the control station 40. The computer system is further programmed to control operation of the laser range meter and receive range data therefrom for transmission to the control station 40. The local positioning system may further comprise a wireless transceiver and an antenna to enable bidirectional, wireless electromagnetic wave communications with a control station. The local positioning system preferably has the capabilities described in U.S. Pat. Nos. 7,859,655, 9,285,296, and 8,447,805 and U.S. Patent Application Pub. No. 2018/0120196, the disclosures of which are incorporated by reference herein in their entireties. The image data acquired by the video camera of the local positioning system may undergo image processing as disclosed in U.S. Pat. No. 8,744,133.

An alternative 3-D localization approach involves placing two or more UAV-placed visible targets, such as ink marks, adjacent to the repair area. The marks would be used by the UAV to accurately re-orient itself to the repair during each successive repair operation. Automated video localization equipment would be employed to re-orient the UAV to the repair area using the usable marks.

While methods and apparatus for repairing a structure or object using a tool-equipped UAV have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The invention claimed is:

1. An apparatus comprising an unmanned aerial vehicle and a tool pick-and-place module coupled to the unmanned aerial vehicle, wherein:

the unmanned aerial vehicle comprises a body frame, a plurality of rotor motors mounted to the body frame, and a plurality of rotors operatively coupled to respective rotor motors of the plurality of rotor motors;

the tool pick-and-place module comprises a platform comprising a plurality of tool stations disposed one or both of on or in the platform, wherein each of the plurality of tool stations is separate and distinct from one another, a tool pick-and-place robot mounted to the platform between the tool stations, and a plurality of tools positioned at respective tool stations, wherein each of the plurality of tool stations separately and removably retains a respective one of the plurality of tools, and wherein each of the plurality of tools is configured to separately and removably seat at a respective one of the plurality of tool stations; and the tool pick-and-place robot comprises a base, a hub which is rotatable about the base, an arm having a first end fixedly coupled to the hub and a second end at a distance from the hub, and a tool holder mounted to the second end of the arm.

2. The apparatus as recited in claim 1, wherein:

the hub comprises an inner cylinder that is rotatable relative to the base and a capped head that is rotatable in tandem with the inner cylinder and translatable relative to the inner cylinder; and the first end of the arm is fixedly coupled to and extends outward from the capped head.

3. The apparatus as recited in claim 2, wherein the tool pick-and-place robot further comprises:

a first motor operatively coupled to drive rotation of the inner cylinder; and a second motor operatively coupled to drive translation of the capped head.

4. The apparatus as recited in claim 2, wherein the plurality of tool stations are disposed at respective positions which are angularly distributed in a circular cylindrical frame of reference centered at an axis of rotation of the tool pick-and-place robot, and the plurality of tools stationed at the plurality of tool stations are disposed at least partly within a length of the arm of the tool pick-and-place robot.

5. The apparatus as recited in claim 4, wherein:

the tool holder comprises an electro-magnet or electro-permanent magnet; and each of the plurality of tools comprises a respective permanent magnet disposed on the tool at a position where the permanent magnet is magnetically coupled to the electro-magnet or electro-permanent magnet when the arm is in contact with the tool.

6. The apparatus as recited in claim 1, wherein the tool holder comprises a vacuum gripper.

7. The apparatus as recited in claim 1, wherein the plurality of tools comprise a subtractive repair tool and an additive repair tool.

8. The apparatus as recited in claim 1, wherein the plurality of tool stations are disposed at respective positions which are angularly distributed in a circular cylindrical frame of reference centered at an axis of rotation of the tool pick-and-place robot, and the plurality of tools stationed at the plurality of tool stations are disposed at least partly within a length of the arm of the tool pick-and-place robot.

9. The apparatus as recited in claim 1, wherein:

the tool holder comprises an electro-magnet or electro-permanent magnet; and each of the plurality of tools comprises a respective permanent magnet disposed on the tool at a position where the permanent magnet is magnetically coupled to the electro-magnet or electro-permanent magnet when the arm is in contact with the tool.

10. The apparatus as recited in claim 1, wherein the tool holder comprises a mechanical clamp.

11. The apparatus as recited in claim 1, further comprising:

bearings which rotatably couple an inner cylinder to the base; and linear slides which translatably couple the capped head to the inner cylinder.

12. The apparatus as recited in claim 11, further comprising:

a lift mechanism coupled to the capped head;

a lift drive motor coupled to the lift mechanism;

a rotation gear train coupled to the inner cylinder; and a rotation drive motor coupled to the rotation gear train.

13. The apparatus as recited in claim 12, wherein the lift mechanism comprises a rack coupled to the capped head and a pinion gear coupled to the rack and to the lift drive motor.

14. The apparatus as recited in claim 12, wherein the lift mechanism comprises a lead screw coupled to the capped head and a nut coupled to the lead screw and to the lift drive motor.

15. A method for an apparatus comprising an unmanned aerial vehicle and a tool pick-and-place module coupled to the unmanned aerial vehicle, wherein:

the unmanned aerial vehicle comprises a body frame, a plurality of rotor motors mounted to the body frame, and a plurality of rotors operatively coupled to respective rotor motors of the plurality of rotor motors;

the tool pick-and-place module comprises a platform comprising a plurality of tool stations disposed one or both of on or in the platform, wherein each of the plurality of tool stations is separate and distinct from one another, a tool pick-and-place robot mounted to the platform, and a plurality of tools positioned at respective tool stations, wherein each of the plurality of tool stations is configured to separately retain a respective one of the plurality of tools, and wherein each of the plurality of tools is configured to separately and removably seat at a respective one of the plurality of tool stations; and the tool pick-and-place robot comprises a base, a hub which is rotatable about the base, an arm having a first end fixedly coupled to the hub and a second end at a distance from the hub, and a tool holder mounted to the second end of the arm, the method comprising:

attaching the pick-and-place robot to the platform;

selecting first and second tools for performing first and second repair operations respectively of a repair procedure;

placing the first and second tools at first and second tool stations respectively on the platform;

coupling the platform to the unmanned aerial vehicle while the unmanned aerial vehicle is on ground at a ground station;

controlling the unmanned aerial vehicle to take-off from the ground station and fly toward a repairable structure while carrying the platform;

controlling the unmanned aerial vehicle to land on a surface of the repairable structure;

moving the arm of the pick-and-place robot to a position whereat the tool holder attached to one end of the arm overlies the first tool station;

lowering the arm until the tool holder is in contact with the first tool;

activating the tool holder to couple the first tool to the end of the arm;

moving the arm to transport the first tool from the first tool station to a position overlying a damage site on the surface of the repairable structure;

using the first tool to perform the first repair operation on the damage site;

moving the arm to transport the first tool from the damage site to the first tool station; and releasing the first tool while the first tool is located at the first tool station.

16. The method as recited in claim 15, further comprising:

moving the arm to a position whereat the tool holder overlies the second tool station;

lowering the arm until the tool holder is in contact with the second tool;

activating the tool holder to couple the second tool to the end of the arm;

moving the arm to transport the second tool from the second tool station to the position overlying the damage site;

using the second tool to perform the second repair operation on the damage site;

moving the arm to transport the second tool from the damage site to the second tool station; and releasing the second tool while the second tool is located at the second tool station.

17. The method as recited in claim 16, further comprising:

determining that a last repair operation of the repair procedure has been performed;

controlling the unmanned aerial vehicle to take-off from the repairable structure and fly toward the ground station while carrying the platform; and controlling the unmanned aerial vehicle to land on the ground at the ground station.

18. The method as recited in claim 15, further comprising employing automated video localization equipment to orient the unmanned aerial vehicle relative to the damage site using visible marks on the surface of the structure.

19. A system comprising:

an unmanned aerial vehicle comprising:

a body frame;

rotor motors mounted to the body frame; and rotors operatively coupled to the rotor motors; and a tool pick-and-place module coupled to the unmanned aerial vehicle, the tool pick-and-place module comprising:

a platform including tool stations coupled to the platform, wherein each of the tool stations is separate and distinct from one another;

a tool pick-and-place robot mounted to the platform between the tool stations;

tools positioned at the tool stations, wherein each of the tool stations separately and removably retains a respective one of the tools, and wherein each of the tools is configured to separately and removably seat at a respective one of the tool stations.

20. The system of claim 19, wherein the tool stations are disposed at respective positions which are angularly distributed in a circular cylindrical frame of reference centered at an axis of rotation of the tool pick-and-place robot, and the tools stationed at the tool stations are disposed within a length of the arm of the tool pick-and-place robot, wherein the tools comprise:

a sander;

an additive repair tool;

a dryer; and a cleaner, wherein the tool stations comprise:

a first tool station that separately and removably retains the sander;

a second tool station that separately and removably retains the additive repair tool;

a third tool station that separately and removably retains the dryer; and a fourth tool station that separately and removably retains the cleaner.

* * * * *